US010424840B2

(12) United States Patent
Nishimoto

(10) Patent No.: US 10,424,840 B2
(45) Date of Patent: Sep. 24, 2019

(54) METHOD FOR QUANTIZED-MULTIPLE/NARROW BEAM FORMING WITHIN ARRAY ANTENNA BEAMWIDTH, DEVICE FOR QUANTIZED-MULTIPLE/NARROW BEAM FORMING WITHIN ARRAY ANTENNA BEAMWIDTH, AND RADAR SYSTEM

(71) Applicant: Shinkichi Nishimoto, Tokyo (JP)

(72) Inventor: Shinkichi Nishimoto, Tokyo (JP)

(*) Notice: Subject to any disclaimer, the term of this patent is extended or adjusted under 35 U.S.C. 154(b) by 165 days.

(21) Appl. No.: 15/383,552

(22) Filed: Dec. 19, 2016

(65) Prior Publication Data

US 2017/0098891 A1   Apr. 6, 2017

Related U.S. Application Data

(63) Continuation of application No. PCT/JP2015/069065, filed on Jul. 1, 2015.

(30) Foreign Application Priority Data

Jul. 2, 2014   (JP) ................... 2014-137144

(51) Int. Cl.
*H01Q 21/08* (2006.01)
*G01S 3/04* (2006.01)
(Continued)

(52) U.S. Cl.
CPC .............. *H01Q 3/38* (2013.01); *G01S 3/043* (2013.01); *G01S 3/14* (2013.01); *G01S 3/46* (2013.01);
(Continued)

(58) Field of Classification Search
CPC .. H04B 7/0617; H04B 7/0695; H04B 7/0408; G01S 13/42; G01S 2013/0254;
(Continued)

(56) References Cited

U.S. PATENT DOCUMENTS 8,289,203 B2 * 10/2012 Culkin ................. H01Q 21/061
342/117
8,867,633 B2 * 10/2014 Suehiro ................. H04L 5/0023
375/260
(Continued)

FOREIGN PATENT DOCUMENTS

JP   2012-168156 A   9/2012
JP   2014-115160 A   6/2014

OTHER PUBLICATIONS

Jian Li and Petre Stoica, "MIMO RADAR Signal Processing" pp. 73-77, 2009, A John Wiley & Sons Inc.
Search Report issued in corresponding International Application No. PCT/JP2015/069065, dated Sep. 8, 2015.

*Primary Examiner* — Olumide Ajibade Akonai
(74) *Attorney, Agent, or Firm* — McDermott Will & Emery LLP

(57) ABSTRACT

A method includes forming an output amplitude vector of an array antenna of addition values of a signal incoming wave reception output and a reception system noise output; generating a virtual array antenna output amplitude vector of addition values of a signal incoming wave reception output amplitude and a virtual noise wave reception output amplitude such that array output average power of the virtual noise wave is equivalent to average power of the reception system noise output, and deriving a singular linear equation indicating cause-effect relationship of the concerned generation; deriving a non-singular linear equation from the singular linear equation; and obtaining a signal incoming wave amplitude vector using the non-singular linear equation. While deriving the singular linear equation, a virtual array antenna output amplitude vector is generated that includes amplitudes in quantized-unit-angle narrow beams obtained by dividing the transceiving beamwidth of the incoming wave into quantized unit angles.

8 Claims, 14 Drawing Sheets

(51) Int. Cl.
*H01Q 3/38* (2006.01)
*H04B 7/06* (2006.01)
*G01S 13/58* (2006.01)
*G01S 3/46* (2006.01)
*G01S 13/42* (2006.01)
*G01S 3/14* (2006.01)
*G01S 13/02* (2006.01)

(52) U.S. Cl.
CPC ............. *G01S 13/42* (2013.01); *H01Q 21/08* (2013.01); *H04B 7/0617* (2013.01); *G01S 13/58* (2013.01); *G01S 2013/0254* (2013.01)

(58) Field of Classification Search
CPC . G01S 3/46; G01S 13/48; G01S 3/043; G01S 3/14; G01S 7/02; G01S 7/282; G01S 7/285; G01S 2013/0245; H01Q 21/08; H01Q 3/38; H01Q 3/26; H01Q 21/061; H01Q 21/22; H01Q 21/0025; H01Q 21/065; G06F 17/16
See application file for complete search history.

(56) References Cited

U.S. PATENT DOCUMENTS

| | | | |
|---|---|---|---|
| 9,964,631 B2* | 5/2018 | Choi | G01S 7/032 |
| 2008/0226003 A1* | 9/2008 | Chevalier | H04J 3/0602 |
| | | | 375/354 |
| 2011/0181459 A1* | 7/2011 | Feger | G01S 3/465 |
| | | | 342/146 |
| 2012/0268314 A1* | 10/2012 | Kuwahara | G01S 3/74 |
| | | | 342/147 |

* cited by examiner $\theta = \theta_0 + \theta_{mx}$   $\theta_{mx} = -0.5\,\theta_B + (mx-0.5)\Delta_\theta$
$\phi = \phi_0 + \phi_{my}$   $\phi_{my} = -0.5\,\phi_B + (mx-0.5)\Delta_\phi$ $\theta_0, \phi_0$: BEAM CENTER DIRECTION ANGLES ON $\theta$ PLANE AND $\phi$ PLANE
ARRAY ELEMENT NUMBER: $nx = 1$ TO $N$
DIVISION ANGLE NUMBER ON $\theta$ PLANE: $mx = 1$ TO $Mx$
DIVISION ANGLE NUMBER ON $\phi$ PLANE: $my = 1$ TO $My$

METHOD FOR QUANTIZED-MULTIPLE/NARROW BEAM FORMING WITHIN ARRAY ANTENNA BEAMWIDTH, DEVICE FOR QUANTIZED-MULTIPLE/NARROW BEAM FORMING WITHIN ARRAY ANTENNA BEAMWIDTH, AND RADAR SYSTEM

CROSS-REFERENCE TO RELATED APPLICATIONS

This application is a continuation of PCT International Application No. PCT/JP2015/069065 filed on Jul. 1, 2015 which claims the benefit of priority from Japanese Patent Application No. 2014-137144 filed on Jul. 2, 2014, the entire contents of which are incorporated herein by reference.

BACKGROUND OF THE INVENTION

1. Field of the Invention

The present invention relates to a method for quantized-multiple/narrow beam forming within array antenna beamwidth, a device for quantized-multiple/narrow beam forming within array antenna beamwidth, and a radar system.

2. Description of the Related Art

In the past, a DBF (Digital Beam-Forming) radar having a digital beam-forming function has been disclosed. In such a DBF radar, although a multibeam can be formed in an arbitrary direction, the beamwidth that is formed is determined by the ratio of the aperture dimension of the antenna and the wavelength of radio waves. The aperture dimension of the antenna has physical restrictions regarding dimensions/weight from the perspective of the antenna configuration. Regarding the wavelength of radio waves too, since the optimum frequency band is determined according to the object of the radar system, it is a difficult to reduce the antenna beamwidth and still form a multibeam having a plurality of narrow beams fitting within the beamwidth.

In contrast, in a synthetic aperture radar, a large-aperture-dimension antenna can be effectively configured according to the moving platform-borne along with straight line at constant velocity and multiple narrow beam can be equivalently formed, thereby making it possible to obtain accurate radar images of the target surface for observation. Hence, a synthetic aperture radar is mounted on an airplane or a satellite, and is utilized in performing accurate surface observation.

On the other hand, in a synthetic aperture radar, in order to implement the functions mentioned above, it is necessary to apply time variation of Doppler frequency with respect to the reflected waves from the target on the ground, while maintaining the uniform linear motion of the moving platform on which the radar is mounted; and the target area for observation is primarily lateral to the direction of movement. Moreover, within a particular angular range including the frontal direction of movement, a blind angle at which image is not observable is formed due to only a small variation in the Doppler frequency.

As another narrow beam forming method, a MIMO (Multi Input Multi Output) radar is described in Jian Li and Petre Stoica, "MIMO RADAR SIGNAL PROCESSING" pp. 73-77, 2009, A JOHN WILEY & SONS INC. In that radar, an antenna unit has a combination of transceiving (that is, transmitting/receiving) antennas, in which a single receiving antenna having an aperture dimension D and a plurality of (N number of) transmitting antennas are spaced out by the aperture dimension D of the receiving antenna, for equivalently expanding the aperture of the receiving antenna by ND times and obtaining narrow beams. However, in this method, since the radar is configured with separate antennas for reception and transmission and with N number of transmitters, the configuration scale becomes huge. Besides, for the system to get established, it is a prerequisite that mutually-orthogonal signals are transmitted by each transmitting antenna in the radar, and that there is no interference on the receiving side. For that reason, in order to avoid interference on the receiving side at which various waveform distortions are received, it is a challenge to secure the orthogonality condition among received waveforms.

As another narrow beam forming method that is easy to implement, narrow beams are formed using millimeter waves in an aperture antenna, and the configuration is used as an airport-surface observing radar as an example. In this case, because of the restriction on the transmission power that can be generated in the millimeter waves and because of the susceptibility to rainfall-induced attenuation in the used radio waves, the monitoring range is limited to a relatively short distance.

As described above, a conventional DBF radar not only can be used as a ground-based radar but can also be installed and operated in a moving platform. However, due to the restriction on the aperture dimension from the perspective of the system configuration, the lower limit value of the beamwidth that is formed is determined by the ratio of the aperture dimension of the antenna to the wavelength of radio waves. Hence, the angle resolution capability reaches the limit at about the transceiving beamwidth that is achieved. For that reason, it is a difficult to individually separate/identify a plurality of target signals, which is received within the transceiving beamwidth, and to observe the signal strength, the Doppler frequency indicating the velocity of each target.

SUMMARY OF THE INVENTION

It is an object of the present invention to at least partially solve the problems in the conventional technology.

In accordance with one aspect of the present invention, a method for quantized-multiple/narrow beam forming within a transceiving beamwidth, includes: forming, as a real array antenna output vector, an output amplitude vector of an array antenna that is made of addition values of a signal incoming wave reception output which are received and a reception system noise output, in an array antenna in which at least a single linear array antenna having a plurality of antenna elements arranged therein is placed; generating, using the real array antenna output vector, a virtual array antenna output amplitude vector that is made of addition values of a signal incoming wave reception output amplitude and a virtual noise wave reception output amplitude which is set in such a way that array output average power of the virtual noise wave is equivalent to average power of the reception system noise output, and deriving a singular linear equation indicating cause-effect relationship of concerned generation; deriving a non-singular linear equation from the singular linear equation by approximation; and obtaining a signal incoming wave amplitude vector via the non-singular linear equation. In the step for deriving the singular linear equation, a virtual array antenna output amplitude vector is generated such that the virtual array antenna output amplitude includes amplitudes in quantized-unit-angle narrow beams obtained by dividing the transceiving beamwidth of the incoming wave into quantized unit angles.

In accordance with another aspect of the present invention, a device for quantized-multiple/narrow beam forming within a transceiving beamwidth, includes: an array antenna in which at least a linear array antenna, which has a plurality of antenna elements arranged therein, is placed; a real-array-antenna output vector data forming unit that forms, as a real array antenna output vector, an output amplitude vector of an array antenna that is made of addition values of a signal incoming wave reception output which are received and a reception system noise output, in the array antenna; a virtual-array-antenna-output amplitude vector generating unit that generates, using the real array antenna output vector, a virtual array antenna output amplitude vector that is made of addition values of a signal incoming wave reception output amplitude and a virtual noise wave reception output amplitude which is set in such a way that array output average power of the virtual noise wave is equivalent to average power of the reception system noise output, and derives a singular linear equation indicating cause-effect relationship of concerned generation; a synthesizing unit that derives a non-singular linear equation from the singular linear equation by approximation; and a calculation detecting unit that obtains a signal and virtual noise incoming wave amplitude vector via the non-singular linear equation. During derivation of the singular linear equation, the virtual-array-antenna-output amplitude vector generating unit generates a virtual array antenna output amplitude vector such that the virtual array antenna output amplitude vector includes amplitudes in quantized-unit-angle narrow beams obtained by dividing the transceiving beamwidth of the incoming wave into quantized unit angles.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
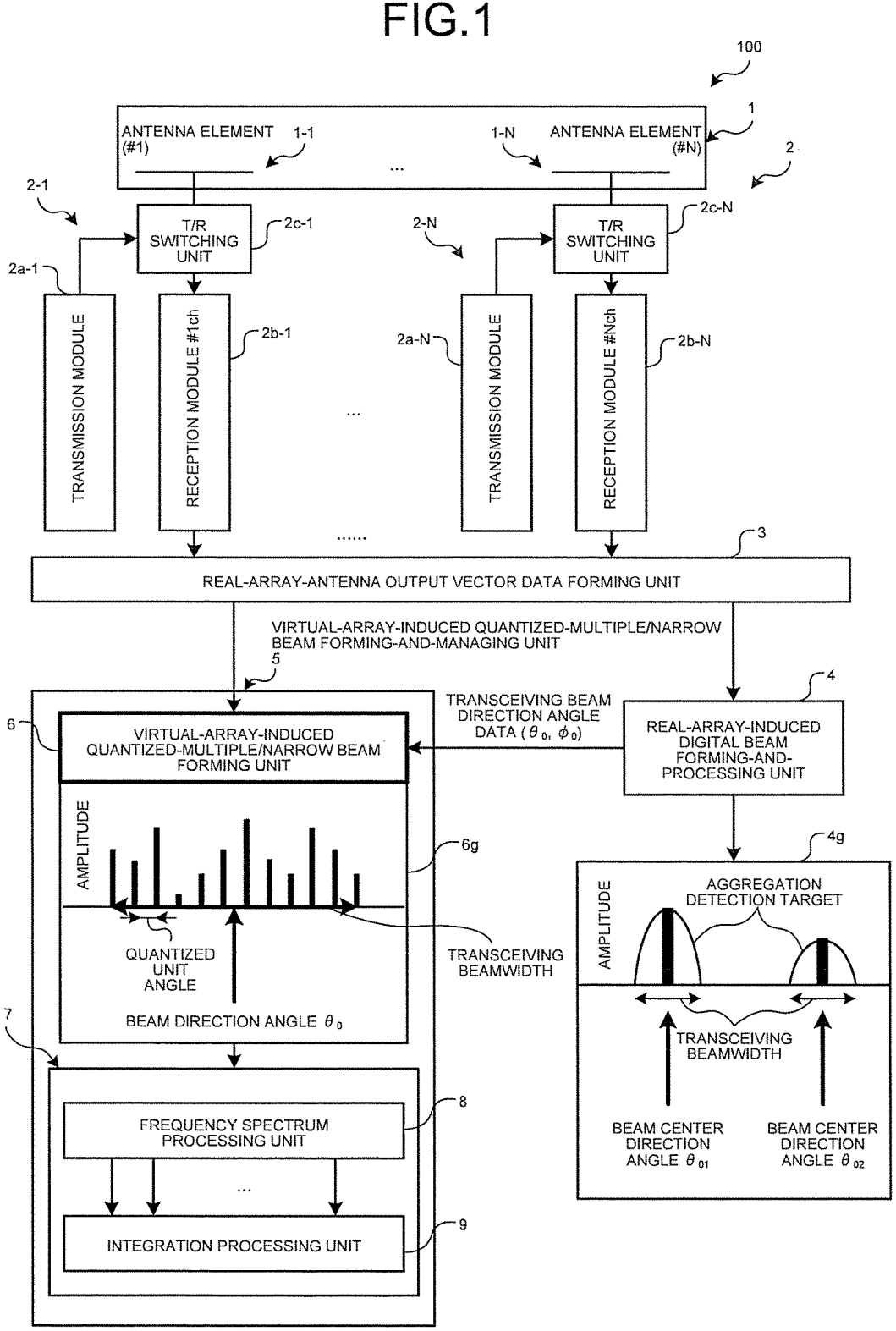
FIG. 1 is a configuration diagram of the main parts of a radar system according to a first embodiment.

Exemplary embodiments of a method for quantized-multiple/narrow beam forming within array antenna beamwidth, a device for quantized-multiple/narrow beam forming within array antenna beamwidth, and a radar system are described below in detail with reference to the accompanying drawings. However, the present invention is not limited by the embodiments described below. Moreover, in the drawings, identical or corresponding elements are referred to by the same reference numbers. Furthermore, since incoming waves are received within the same angular range as the beamwidth of transmission beams, sometimes the term "transceiving beamwidth" is used in the present written description.

First Embodiment

FIG. 1 is a configuration diagram of the main parts of a radar system according to a first embodiment. As illustrated in FIG. 1, a radar system 100 constitutes a DBF radar system; and includes an array antenna 1, a transceiving (or transmitting/receiving) unit 2 (hereinafter, described as T/R unit 2), a real-array-antenna output vector data forming unit 3, a real-array-induced digital beam forming-and-processing unit 4, and a virtual-array-induced quantized-multiple/narrow beam forming-and-managing unit 5 functioning as a quantized-multiple/narrow beam forming device.

The array antenna 1 represents an array antenna in which N number of antenna elements 1-1 to 1-N (where N represents an integer equal to or greater than two) are arranged in a linear manner. The antenna elements 1-1 to 1-N have #1 to #N, respectively, attached thereto. Meanwhile, in the following explanation, N may be suitably replaced with Nx.

The T/R unit 2 includes T/R modules 2-1 to 2-N that are connected to the antenna elements 1-1 to 1-N, respectively. The T/R modules 2-1 to 2-N respectively include transmission modules 2a-1 to 2a-N, reception modules 2b-1 to 2b-N, and T/R switching units 2c-1 to 2c-N. The transmission modules 2a-1 to 2a-N generate transmission signals that are supposed to be transmitted from the antenna elements 1-1 to 1-N, respectively. The reception modules 2b-1 to 2b-N receive the incoming waves that have been received by the antenna elements 1-1 to 1-N, respectively. Then, from the received incoming waves, the reception modules 2b-1 to 2b-N generate digital data of orthogonal I/Q channels, and outputs the digital data to the real-array-antenna output vector data forming unit 3. Meanwhile, the reception modules 2b-1 to 2b-N have #1ch to #Nch, respectively, attached thereto. The T/R switching units 2c-1 to 2c-N switch the state of the antenna elements 1-1 to 1-N, respectively, between the transmission state and the reception state.

Based on the digital data input from the reception modules 2b-1 to 2b-N, the real-array-antenna output vector data forming unit 3 forms vector data of the length N from the digital data of the orthogonal I/Q channels held by the receiving incoming waves, and outputs the vector data to the real-array-induced digital beam forming-and-processing unit 4 and the virtual-array-induced quantized-multiple/narrow beam forming-and-managing unit 5.

The real-array-induced digital beam forming-and-processing unit 4 has identical functions to the real-array-induced digital beam forming and processing performed in a conventional DBF radar. Upon receiving the input of the vector data from the real-array-antenna output vector data forming unit 3, the real-array-induced digital beam forming-and-processing unit 4 forms receiving beams at the specified direction angle based on the output vector data, and detects target-reflected waves (incoming waves) at the beamwidth accuracy according to the conventional method. At that time, even if a plurality of incoming waves is received within the beamwidth, they are added and aggregated to a predetermined beamwidth before being detected. Hence, as illustrated in graph 4g, there is no information available on the incoming angle/the reception strength of the individual incoming waves included in that beamwidth. Meanwhile, the real-array-induced digital beam forming-and-processing unit 4 outputs direction angle data $(\theta_0, \phi_0)$ of the transceiving beams to the virtual-array-induced quantized-multiple/narrow beam forming-and-managing unit 5.

The virtual-array-induced quantized-multiple/narrow beam forming-and-managing unit 5 includes a virtual-array-induced quantized-multiple/narrow beam forming unit 6 and a processing unit 7. Moreover, the processing unit 7 includes a frequency spectrum processing unit 8 and an integration processing unit 9. Meanwhile, the virtual-array-induced quantized-multiple/narrow beam forming-and-managing unit 5 that constitutes the main part according to the first embodiment of the present invention has signal processing functions (described later). The numerical data processing that is intended for implementing such signal processing functions includes the product-sum operation of numerical data; temporary storage of operation data; storage of matrix data set in advance and storage of pseudo inverse matrices and inverse matrix data of the matrix data; and a total control function embedded in an operation processing control program. Thus, the virtual-array-induced quantized-multiple/narrow beam forming-and-managing unit 5 can be configured as a device with the use of a normal communication device or a processor for radars.

The virtual-array-induced quantized-multiple/narrow beam forming unit 6 receives input of the vector data from the real-array-antenna output vector data forming unit 3 and receives input of the direction angle data $(\theta_0, \phi_0)$ of the transceiving beams from the real-array-induced digital beam forming-and-processing unit 4. Based on the input data, the virtual-array-induced quantized-multiple/narrow beam forming unit 6 separates and detects, at each quantized unit angle, the received incoming waves within the transceiving beamwidth; and outputs the detection data regarding the narrow beams at each quantized unit angle to the frequency spectrum processing unit 8.

In the virtual-array-induced quantized-multiple/narrow beam forming unit 6, as illustrated in a graph 6g, the received incoming waves within the transceiving beamwidth can be detected at each quantized unit angle.

The frequency spectrum processing unit 8 receives input of the detection data regarding the narrow beams at each quantized unit angle from the virtual-array-induced quantized-multiple/narrow beam forming unit 6; further performs separation and detection according to frequency resolution using an MTI (Moving Target Indication) filter and a DFT-based (Discrete Fourier Transform) narrowband filter; and outputs the frequency-by-frequency detection data to the integration processing unit 9. Thus, the integration processing unit 9 receives input of the frequency-by-frequency detection data from the frequency spectrum processing unit 8, and accordingly obtains detailed information such as the number of targets, the incoming angle, the signal strength, and the movement rate related to the target signals.

Figure 2A:
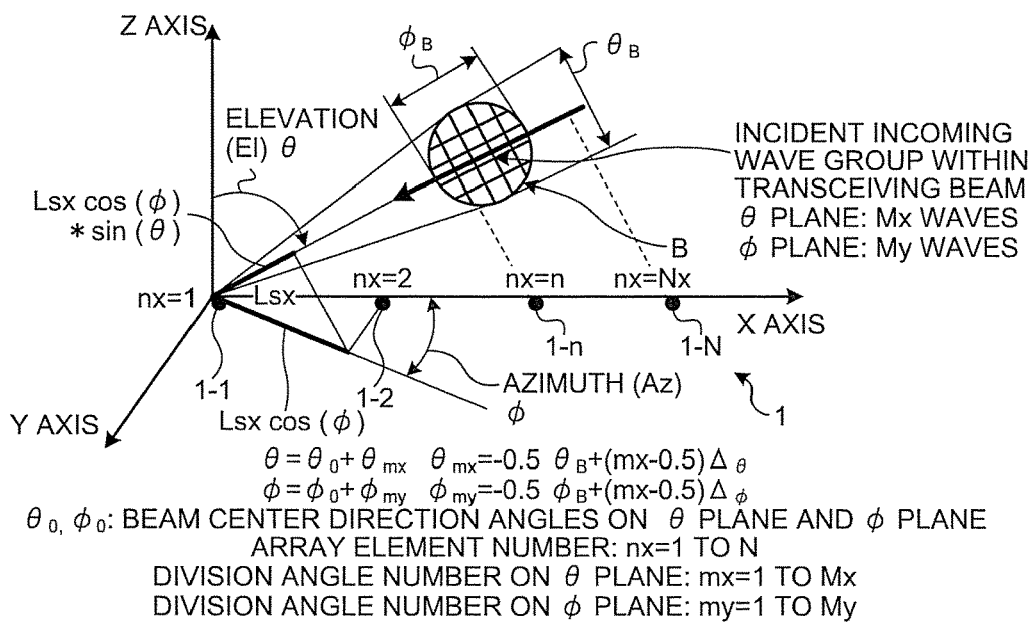
FIG. 2A is a diagram for explaining quantized/narrow beam forming in transceiving (T/R) beam width.
Figure 2B:
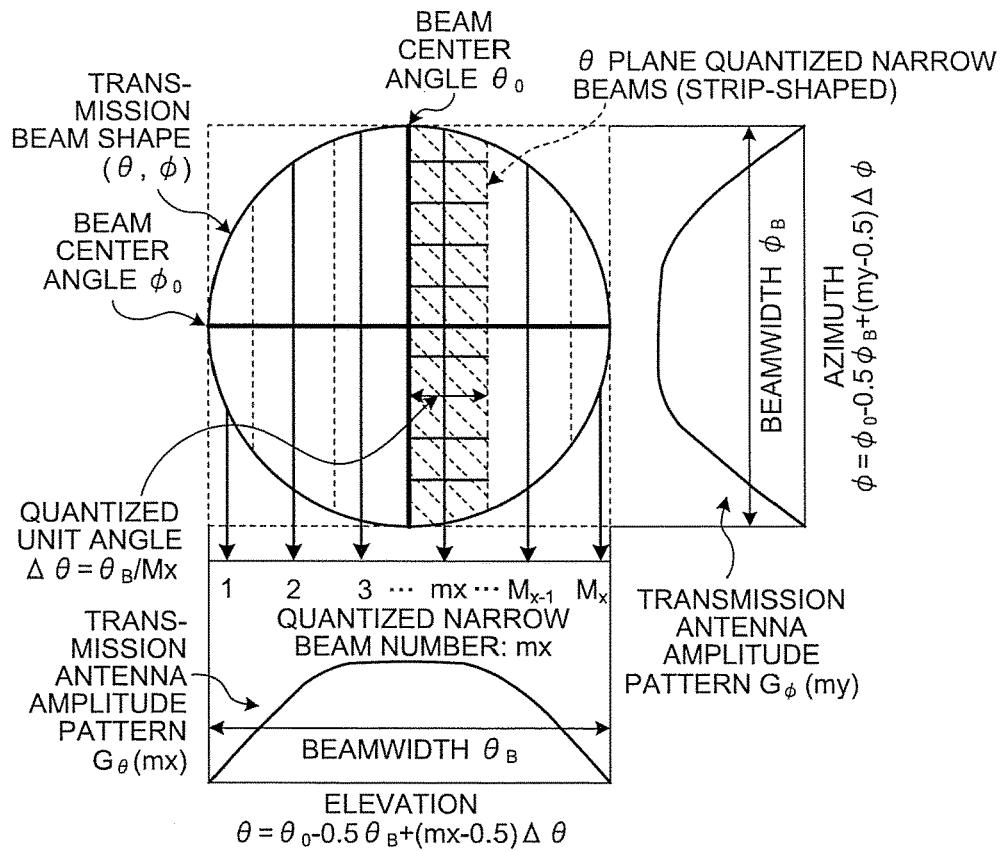
FIG. 2B is a diagram for explaining quantized/narrow beam forming in transceiving (T/R) beam width.

Given below is the explanation of quantized/narrow beam forming in T/R beam width. FIGS. 2A and 2B are diagrams for explaining quantization/narrow beam forming in T/R beam width. Firstly, as illustrated in FIG. 2A, with the direction of arrangement of the array antenna 1 serving as the X axis, Cartesian coordinates are defined. Herein, black circles represent the antenna elements 1-1, 1-2, ..., 1-n, ..., 1-N. Moreover, nx represents an arbitrary element number. Furthermore, Lsx represents the distance between the neighboring antenna elements on the X axis. When azimuth $\phi$ and elevation $\theta$ are defined with respect to the direction of a transceiving beam B (the direction of incoming waves), the effective inter-element space between the antenna elements that contributes in the reception of the incoming waves is equal to $Lsx*\cos(\phi)*\sin(\theta)$.

Herein, $\theta_0$ and $\phi_0$ represent the beam center direction angles at the $\theta$ plane and the $\phi$ plane, respectively, of the transceiving beam B; and $\theta_B$ and $\phi_B$ represent the beamwidth on the $\theta$ plane and the $\phi$ plane, respectively, of the transceiving beam B. Moreover, it is assumed that $\theta_B$ and $\phi_B$ are divided into Mx number of divisions and My number of divisions which are equivalent to Nx (the number of array elements), respectively, at the quantized unit angles. If mx represents a division angle number on the $\theta$ plane, then mx takes a value between 1 and Mx. Similarly, if my represents a division angle number on the $\phi$ plane, then my takes a value between 1 and My. Moreover, if $\theta$mx represents the quantized angle (the quantized incoming angle) of #mx; then $\theta=\theta_0+\theta$mx, $\theta$mx$=-0.5\theta_B+$(mx$-0.5)\Delta\theta$, and $\Delta\theta=\theta_B$/Mx hold true. In an identical manner, if $\phi$my represents the quantized angle (the quantized incoming angle) of #my; then $\phi=\phi_0+$ $\phi$my, $\phi$my$=-0.5\phi_B+$(my$-0.5)\Delta\phi$, and $\Delta\phi=\phi_B$/My hold true. In this way, in the first embodiment, the incoming waves within the transceiving beam B are divided in squares of (Mx×My) number of quantized unit incoming waves (quantized beams) representing narrow beams assumed to form an incoming wave group.

At that time, regarding the incoming waves having amplitude 1 and attributed to the antenna element with an arbitrary element number nx, a reception signal amplitude S(mx, my, nx) is expressed as given below in Equation (1-1) to Equation (1-4).

$$S(mx, my, nx) = \exp\left[j*2\pi*\left(\frac{Lsx}{\lambda}\right)*\left\{\begin{array}{l}\cos(\varphi_0+\varphi_{my})* \\ \sin(\theta_0+\theta_{my})*(nx-1)\end{array}\right\}\right] \quad (1\text{-}1)$$

$$\cong \exp\left[\begin{array}{l}j*2\pi*\left(\frac{Lsx}{\lambda}\right)*\left\{\begin{array}{l}\cos(\varphi_0)- \\ \sin(\varphi_0)*+\varphi_{my}\end{array}\right\}* \\ \{\sin(\theta_0)+\cos(\theta_0)*+\theta_{my}\}*(nx-1)\end{array}\right] \quad (1\text{-}2)$$

$$\cong \exp\left[j*2\pi*\left(\frac{Lsx}{\lambda}\right)*\left\{\begin{array}{l}\cos(\varphi_0)* \\ \sin(\theta_0)*(nx-1)\end{array}\right\}\right] \times \quad (1\text{-}3)$$

$$\exp\left[j*2\pi*\left(\frac{Lsx}{\lambda}\right)*\left\{\begin{array}{l}*\sin(\theta_0)* \\ \sin(\varphi_0)*\varphi_{my}*(nx-1)\end{array}\right\}\right] \times$$

$$\exp\left[j*2\pi*\left(\frac{Lsx}{\lambda}\right)*\left\{\begin{array}{l}\cos(\varphi_0)* \\ \cos(\theta_0)*\theta_{mx}*(nx-1)\end{array}\right\}\right]$$

$$= C_0(nx)*S0_\varphi(my, nx)*S0_\theta(mx, nx) \quad (1\text{-}4)$$

Herein, $C_0$(nx), $S0_\phi$(my, nx), and $S0_\theta$(my, nx) are expressed as given below in Equation (2) to Equation (4), respectively.

$$C_0(nx) = \exp\left[j*2\pi*\left(\frac{Lsx}{\lambda}\right)*\{\cos(\varphi_0)*\sin(\theta_0)*(nx-1)\}\right] \quad (2)$$

$$S0_\varphi(my, nx) = \exp\left[-j*2\pi*\left(\frac{Lsx}{\lambda}\right)*\{\sin(\theta_0)*\sin(\varphi_0)*\varphi_{my}\}*(nx-1)\right] \quad (3)$$

$$S0_\theta(mx, nx) = \exp\left[j*2\pi*\left(\frac{Lsx}{\lambda}\right)*\{\cos(\varphi_0)*\cos(\theta_0)*\theta_{mx}\}*(nx-1)\right] \quad (4)$$

Meanwhile, Equation (1-1) becomes Equation (1-2) due to approximation according to the Taylor expansion of the trigonometric function within the phase term, and is further broken down into a phase weight $C_0$(nx) determined according to the beam center direction angle ($\theta_0$, $\phi_0$); a reception amplitude $S0_\phi$(my, nx) on the $\phi$ plane; and a reception amplitude $S0_\theta$(mx, nx) on the $\theta$ plane.

Herein, the complex amplitude is generated by scattering object's reflectivity and transceiving antenna gain pattern, that of each of the (Mx×My) number of quantized unit incoming waves is given below in Equation (5).

$$AG(\theta_{mx}, \theta_{my}) = AG(mx, my) \quad (5)$$

When the incoming wave amplitude given in Equation (5) is weighted with respect to Equation (1-4), an output amplitude JS(mx, my, nx) of the array antenna element (element number: nx) at the quantized incoming wave number (mx, my) is expressed as general expressions given below in Equation (6-1) and Equation (6-2).

$$JS(mx, my, nx) = AG_s(mx, my)*S(mx, my, nx) \quad (6\text{-}1)$$

$$= C_0(nx)*\{AG_s(mx, my)* \quad (6\text{-}2)$$

$$S0_\varphi(my, nx)*S0_\theta(mx, nx)\}$$

Herein, regarding the angle $\theta$ axis, simplification (degeneration of 2-dimensional function ($\theta$mx, $\phi$my) to 1-dimensional function of $\theta$mx or $\phi$my) is done to two parameters mx and nx; regarding the angle $\phi$ axis, simplification is done to two parameters my and nx; and narrow beam forming is performed.

Data Preprocessing Before Quantized Narrow Beam Forming on $\theta$ Plane

As illustrated in FIG. 2B, using Equation (1-2), a strip-shaped beam (a quantized narrow beam) is formed at each quantized unit angle on the $\theta$ axis. Regarding the quantized narrow beam, it can be considered that there are My number of unit incoming waves each having a different complex amplitude AGs(mx, my) regarding my on the $\phi$ axis in the strip-shaped beam at $\theta$mx, and the element incoming waves regarding to my are added so that an apparent single incoming wave having a complex amplitude AGs$\theta$(mx) is incident as the quantized narrow beam. As a result, a scalar component JS$\theta$(mx, nx) of the array output vector used in forming quantized narrow beams on the $\theta$ plane is expressed in Equation (7-1) to Equation (7-3) given below.

$$JS\theta(mx, nx) = C_0(nx)*\left\{\sum_{my=1}^{My} AG_s(mx, my)*S0_\phi(my, nx)\right\}* \quad (7\text{-}1)$$

$$S0_\theta(mx, nx)$$

$$= C_0(nx)*AG_s\theta(mx)*S0_\theta(mx, nx) \quad (7\text{-}2)$$

$$= C_0(nx)*AG_s\theta(mx)*\exp\left[j*2\pi*\left(\frac{Lsx}{\lambda}\right)* \quad (7\text{-}3)\right.$$

$$\left.\{\cos(\varphi_0)*\cos(\theta_0)*\theta_{mx}\}*(nx-1)\right]$$

Herein, AGs$\theta$(mx) in Equation (7-3) represents the complex amplitude of the mx-th strip-shaped beam on the $\theta$ axis, and is an unknown amplitude that is contingent upon getting coupled with a reception matrix S0$\theta$(mx, nx) and generating an array output amplitude JS$\theta$(mx, nx) on the left side of Equation (7-3).

Herein, the reception amplitude $S0_\theta$(mx, nx) given earlier in Equation (4) can be expressed using a fundamental reception matrix given below in Equation (10). The constituent elements of the matrix $S0_\theta$ can be set using $S0_\theta$(mx, nx). The row numbers of the matrix $S0_\theta$ correspond to the incoming wave numbers mx, while the column numbers of the matrix $S0_\theta$ correspond to the element numbers nx.

Moreover, each row vector represents a vector of the length Nx=N and having reception signals of the incoming waves of the specified incoming wave numbers as the elements.

$$S0_\theta = \begin{bmatrix} S0_\theta(1,1) S0_\theta(1,2) & \dots & S0_\theta(1,nx) & \dots & S0_\theta(1,Nx) \\ S0_\theta(2,1) S0_\theta(2,2) & \dots & S0_\theta(2,nx) & \dots & S0_\theta(2,Nx) \\ & & \dots & & \\ S0_\theta(mx,1) S0_\theta(mx,2) & \dots & S0_\theta(mx,nx) & \dots & S0_\theta(mx,Nx) \\ & & \dots & & \\ S0_\theta(Mx,1) S0_\theta(Mx,2) & \dots & S0_\theta(Mx,nx) & \dots & S0_\theta(Mx,Nx) \end{bmatrix} \quad (10)$$

As given in Equation (4), the elements of the fundamental reception matrix $S0_\theta$ are set using the number N=Nx of elements, a wavelength λ, the inter-element spacing Lsx, the beam center direction angle $(\theta_0, \phi_0)$ of the incoming wave beams, the division number Mx of the beamwidth on the θ axis, and the quantized incoming angle mx; and represent the fundamental elements in the reception state of the array antenna 1. The matrix $S0_\theta$ stores therein the incoming angle information of the received signals, and that information is transferred to the array output vector obtained as a result of coupling with the complex amplitude vector AGsθ. As a result of summation of the Mx number of row vectors that are formed by weighting the row vectors of the matrix $S0_\theta$ with the complex amplitude AGsθ(mx) of the incoming waves, an array output vector JSnθ is obtained and output; and is expressed as a vector notation given below in Equation (11).

Meanwhile, the linear equation for vector notation according to Equation (11) represents a conditional expression of narrow beam forming on the θ plane. Moreover, the number of equations is equal to N=Nx number of array elements; and the length of unknown vector AGsθ to be obtained is equal to Mx. Hence, Mx=N represents the condition for which the solution is available. Meanwhile, in the case of narrow beam forming on the φ plane using an array antenna having the same number N of elements, in Equation (17) given later, the number of elements AGsφ=My=N represents the condition for which the solution is available. Thus, the reception matrices S0θ and S0φ represent square matrixes of the same size according to Mx=My=N.

$$JSn\theta = AG_s\theta * S0_\theta * \text{diag}(C_0) + Jn0 \quad (11)$$

Herein, the vector Jn0 represents a gaussian noise output vector of the length N of each of the antenna elements 1-1 to 1-N(the antenna elements or the reception module). Moreover, the vector $C_0$ represents the phase weight and is expressed as given below in Equation (12) using Equation (2). Each element of the vector $C_0$ is a complex number having the absolute value equal to "1".

$$C_0 = [C_0(1) C_0(2) \dots C_0(N)] \quad (12)$$

When the inverse matrix of the phase weight term diag $(C_0)$ is applied to Equation (11), an output vector JSn0θ of the real array antenna serving as the basis for narrow beam forming is obtained as given below in Equations (13-1) to (13-3). Meanwhile, in the deformation from Equation (13-2) to Equation (13-3), since the vector Jn0 represents gaussian noise, the fact that the statistical characteristics of Jn0*inv [diag($C_0$)] is equivalent to the initial vector Jn0 is utilized.

$$JSn0\theta = JSn\theta * inv[\text{diag}(C_0)] \quad (13-1)$$
$$= AG_s\theta * S0\theta + Jn0 * inv[\text{diag}(C_0)] \quad (13-2)$$
$$= AG_s\theta * S0\theta + Jn0 \quad (13-3)$$

In Equation (13-3), regarding the output vector JsnΘθ of the real array antenna on the left-hand side, it is indicated that the signal output vector (Js0θ=AGsθ*$S0_\theta$) obtained as a result of operation of the complex amplitude vector AGsθ of incoming waves and the fundamental reception matrix $S0_\theta$ of the array antenna 1 is mixed with the noise vector Jn0 on the right-hand side. The output vector Jsn0θ corresponds to the actual measurement value of the array antenna output vector, and constitutes vector data output from the real-array-antenna output vector data forming unit 3.

Data Preprocessing Before Quantized Narrow Beam Forming on φ Plane

On the φ plane too, in an identical manner to the case of the θ plane, a strip-shaped beam (a quantized narrow beam) is formed at each quantized unit angle on the φ axis. However, on the φ axis, when a strip-shaped beam is formed at each quantized unit angle φmy and when Mx number of unit incoming waves having different complex amplitudes on the θ axis are received within the strip-shaped beam; a component JSφ(my, nx) of the array output vector, which is used in forming quantized narrow beams on the φ plane, is expressed as given below in Equation (14-1) to Equation (14-3) according to Equation (7-1) to Equation (7-3).

$$JS\varphi(mx, nx) = C_0(nx) * \left\{ \sum_{mx=1}^{Mx} AG_s(mx, my) * S0\theta(mx, nx) \right\} * \quad (14\text{-}1)$$
$$S0\varphi(my, mx)$$
$$= C_0(nx) * AG_s\varphi(my) * S0\varphi(my, nx) \quad (14\text{-}2)$$
$$= C_0(nx) * AG_s\phi(my) *$$
$$\exp\begin{bmatrix} -j*2\pi*\left(\dfrac{Lsx}{\lambda}\right)*\sin(\theta_0)* \\ \sin(\phi_0)*\phi_{my}*(nx-1) \end{bmatrix} \quad (14\text{-}3)$$

In Equation (14-3), AGsφ(my) represents the complex amplitude of the my-th strip-shaped beam lined on the φ axis, and is an unknown amplitude that is contingent upon getting coupled with a reception matrix S0φ(my, nx) and generating an array output amplitude Jsφ(my, nx) on the left side of Equation (14-3).

Thus, the array output vector JSnφ is expressed as given below in Equation (17) like as Equation (11).

$$JSn\varphi = AG_s\phi * S0\phi * \text{diag}(C_0) + Jn0 \quad (17)$$

When calculation given below in Equation (18-1) to Equation (18-3) is performed with respect to Equation (17) given above, an array antenna output vector JSn0φ intended for quantized narrow beam forming on the φ plane is obtained.

$$JSn0\varphi = JSn\varphi * inv[\text{diag}(C_0)] \quad (18\text{-}1)$$
$$= AG_s\varphi * S0\varphi + Jn0 * inv[\text{diag}(C_0)] \quad (18\text{-}2)$$
$$= AG_s\varphi * S0\varphi + Jn0 \quad (18\text{-}3)$$

In Equation (18-3), regarding the output vector Jsn0φ of the real array antenna on the left-hand side, it is indicated that the signal output vector (Js0φ=AGsφ*$S0_\varphi$) obtained as a result of operation of the complex amplitude vector AGsφ of incoming waves and the fundamental reception matrix S0φ of the array antenna 1 is mixed with the noise vector Jn0 on the right-hand side. The output vector Jsn0φ corresponds to the actual measurement value of the array antenna output vector, and constitutes vector data output from the real-array-antenna output vector data forming unit 3.

Sequence of Data Processing for Quantized Narrow Beam Forming

Given below is the explanation of a sequence of data processing performed in the virtual-array-induced quantized-multiple/narrow beam forming-and-managing unit 5 for quantized narrow beam forming. Meanwhile, the method for quantized narrow beam forming on the θ plane is identical to the method for quantized narrow beam forming on the φ plane, and the following explanation is given about the sequence of data processing for quantized narrow beam forming on the θ plane.

In FIG. 2B is schematically illustrated the narrow beam forming on the θ plane. That is, it is illustrated that the irradiated area that is formed with respect to the target by the transmission beam through the T/R beamwidth is divided into strips on the θ plane, and the reflection intensity of each strip is observed. Moreover, the complex amplitude vector AGsθ of the signal incoming waves distributed on the θ axis represents a value that is obtained when, in the strip-shaped narrow beam incoming waves of #mx, the total My number of quantized unit incoming waves S0φ(my, nx) distributed on the φ plane are coupled as phase weights with the amplitude AGs(mx, my) of each unit incoming wave and the resultant amount is summed regarding all incoming waves My. Herein, AGsθ(mx) represents the effective complex amplitude vector of the strip-shaped narrow beam #mx. Thus, the reception amplitudes of the reflected waves on the θ axis that is attributed to a strip-shaped scatterer are equivalent to the elements of the complex amplitude vector AGsθ of the signal incoming waves obtained relation of Equation (7-1) and Equation (7-2). In the following explanation, according to the first embodiment, a method is explained for detecting/estimating the complex amplitude vector AGsθ, which includes the incoming angle and the amplitude strength information of each single incoming wave, under the mixture of the noise vector Jn0. More particularly, from the output vector data obtained using the array antenna 1 representing the real array antenna and the actual measurement values of the T/R unit 2, output vector data of a virtual array antenna is generated; and a non-singular linear equation is derived from the output vector data forming a non-singular linear equation, and the desired incoming wave amplitude vector is obtained.

Figure 3:
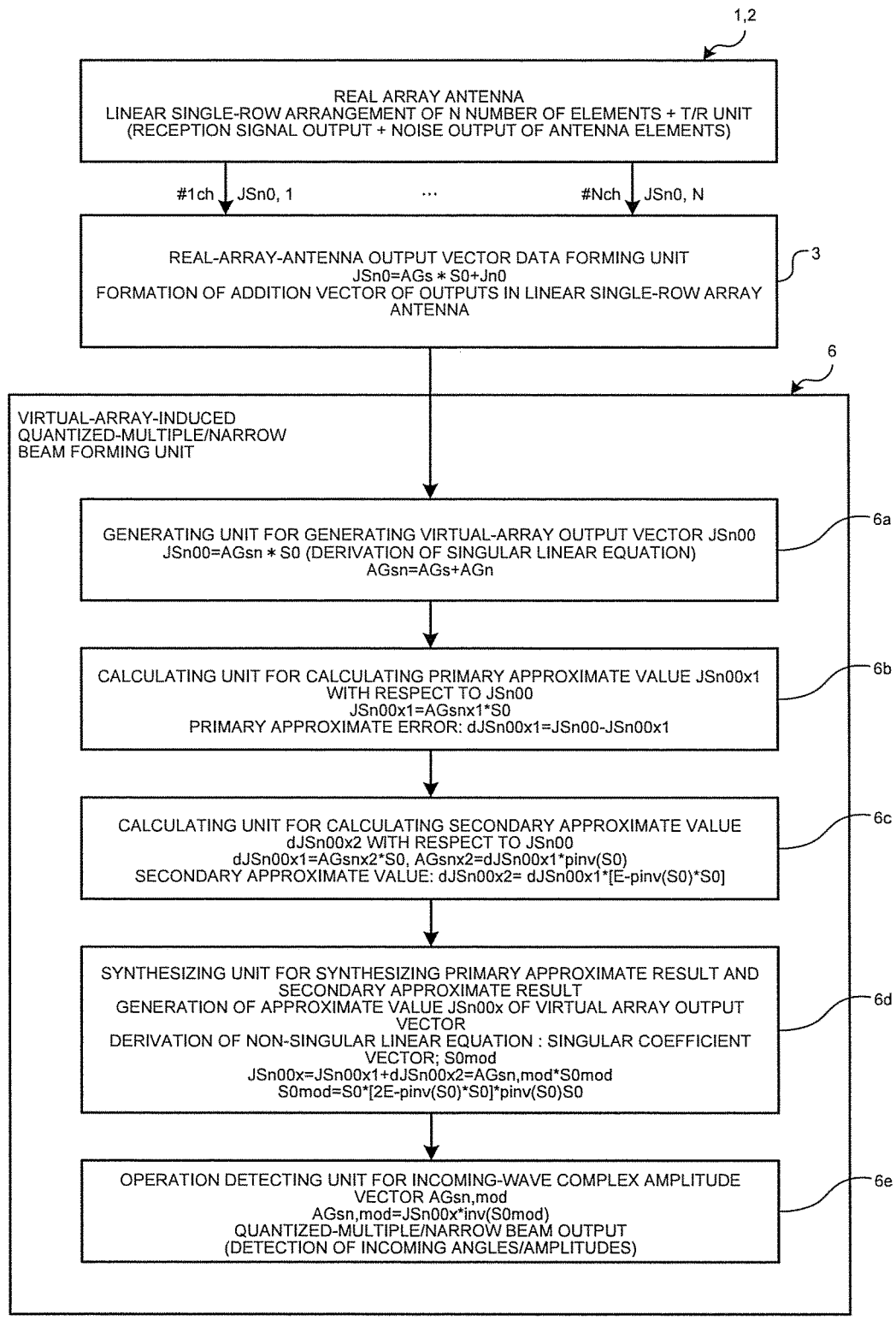
FIG. 3 is a diagram for explaining a quantized-multiple/narrow beam forming unit illustrated in FIG. 1 and a flow of operations performed by the quantized-multiple/narrow beam forming unit according to a quantized-multiple/narrow beam forming method.

FIG. 3 is a diagram for explaining the quantized-multiple/narrow beam forming unit illustrated in FIG. 1 and a flow of operations performed by the quantized-multiple/narrow beam forming unit according to the quantized-multiple/narrow beam forming method. As illustrated in FIG. 3, the virtual-array-induced quantized-multiple/narrow beam forming unit 6 includes a virtual-array output vector generating unit 6a, a primary approximate value calculating unit 6b, a secondary approximate value calculating unit 6c, a synthesizing unit 6d, and an incoming-wave complex amplitude vector operation detecting unit 6e. In the following explanation of the narrow beam forming method implemented on the θ plane, in order to simplify the notation, the real array output vector Jsn0θ, the fundamental reception matrix S0θ, and AGsθ that are given in Equation (13-3) are substituted by JSn0, S0, and AGs, respectively; while nx, Nx, mx, and Mx are substituted by n, N, m, and M, respectively.

With reference to FIG. 3, according to the output data obtained from the array antenna 1 representing a real array antenna via the T/R unit 2, the real-array-antenna output vector data forming unit 3 forms the output vector JSn0 representing output vector data. As described earlier, the output vector JSn0 is expressed as JSn0=AGs*S0+Jn0. Herein, AGs represents the complex amplitude vector of the signal incoming waves, S0 represents the reception matrix of the array antenna 1, and Jn0 represents the gaissian noise output vector that is generated in the reception system of the T/R unit 2 connected to the array antenna 1. The output vector JSn0 is then input to the virtual-array-induced quantized-multiple/narrow beam forming unit 6.

Generation of Virtual Array Output Vector

In the virtual-array-induced quantized-multiple/narrow beam forming unit 6, the virtual-array output vector generating unit 6a converts the output vector JSn0 input thereto, and generates an output vector JSn00 of the virtual array expressed as a linear equation according to a coefficient matrix S0 as given below in Equations (19-1) and (19-2). Herein, the matrix S0 represents a singular coefficient matrix, and Equations (19-1) and (19-2) represent singular linear equations.

$$JSn00 = AG_{sn} * S0 \quad (19\text{-}1)$$
$$= AG_s * S0 + AG_n * S0 \quad (19\text{-}2)$$

Such conversion from the real-array-induced output vector JSn0 into the virtual-array-induced output vector JSn00 is conditional upon the fact that the signal output vector JS0=AGs*S0 is equivalent in the real array and in the virtual array, and that the noise average power of the noise output vector Jn0 of the real array is equivalent to the noise average power of a noise output vector Jn00=AGn*S0 of the virtual array. The detailed explanation is given below.

An average power PSn0 of the real-array-induced output vector JSn0 is expressed as given below in Equations (20-1) to (20-4) according to the inner product of JSn0.

$$PSn0 = \overline{JSno * JSn0'} \quad (20\text{-}1)$$
$$= \overline{(AG_s * S0 + Jn0) * (AG_s * S0 + Jn0)'} \quad (20\text{-}2)$$
$$= \overline{JS0 * JS0'} + \overline{(JS0 * Jn0' + Jn0 * JS0')} + \quad (20\text{-}3)$$
$$\overline{Jn0 * Jn0'}$$
$$= PS0 + Pn0 \quad (20\text{-}4)$$

Herein, the mark ' implies transposition of the complex conjugate of a matrix. Moreover, PS0 represents the signal power and Pn0 represents the noise average power, and are set according to Equations (21) and (22) given below. The average value of the inner product of the signal output vector JS0 and the noise output vector Jn0 included in Equation (20-3) is equal to zero as given below in Equation (23) because of the fact that the signal output vector JS0 and the noise output vector Jn0 are statistically orthogonal.

$$PS0 = \overline{JS0 * JS0'}, (JS0 = AG_s * S0) \quad (21)$$
$$Pn0 = \overline{Jn0 * Jn0'} \quad (22)$$
$$\overline{(JS0 * Jn0' + Jn0 * JS0')} = 0 \quad (23)$$

Herein, the real-array-induced noise output vector Jn0 is set as given below in Equations (24-1) and (24-2).

$$Jn0 = [\, Jn0(1) \quad Jn0(2) \quad \ldots \quad Jn0(N) \,] \tag{24-1}$$
$$= \sigma_n * [\, vn(1) \quad vn(2) \quad \ldots \quad vn(N) \,] \tag{24-2}$$

Herein, φn represents the effective amplitude of a noise population; and vn(1), vn(2), . . . , vn(N) represent sample values of the noise. Moreover, it is assumed that real part and imaginary part of the population has the average value of "0" and the variance of "0.5", and the phase is uniformly distributed at (0, 2π).

When the noise output vector Jn0 is placed with the virtual noise incoming-wave amplitude, the average power Pn00 (the array output average power attributed to the noise incoming waves) of the output vector (Jn0*S0), which is obtained when the noise incoming waves are received by the array antenna 1, is expressed as given below in Equation (25-1) to Equation (25-6).

$$Pn00 = \overline{(Jn0 * S0) * (Jn0 * S0)'} \tag{25-1}$$

$$= \overline{\begin{array}{l}[Jn0 * S0_1\, Jn0 * S0_2\, \ldots\, Jn0 * S0_N\,] * \\ [Jn0 * S0_1\, Jn0 * S0_2\, \ldots\, Jn0 * S0_N\,]'\end{array}} \tag{25-2}$$

$$= \overline{\sum_{n=1}^{N} \{Jn0 * S0(:,n)\} * \{Jn0 * S0(:,n)\}'} \tag{25-3}$$

$$= \overline{\sum_{n=1}^{N} \left\{\sigma_n * \sum_{m=1}^{Mx} vn(m) * S0(m,n)\right\} * \left\{\sigma_n * \sum_{mx=1}^{Mx} vn(m) * S0(m,n)\right\}'} \tag{25-4}$$

$$= \sum_{n=1}^{N} \left(\sigma_n * \sqrt{N}\right) * \left(\sigma_n * \sqrt{N}\right) \tag{25-5}$$

$$= \left[\left(\sigma_n\sqrt{N}\right) * \left(\sigma_n\sqrt{N}\right)\right] * N \tag{25-6}$$

In Equation (25-2) given above, S0n represents an n-row vector of the number n (where n=1, . . . , N) attached to the matrix S0. The noise average power according to Equation (22) is expressed as given below in Equation (26-1) to Equation (26-3).

$$Pn0 = \overline{Jn0 * Jn0'} \tag{26-1}$$

$$= \sigma_n^2 * \overline{\sum_{n=1}^{N} vn(n) * Vn(n)'} \tag{26-2}$$

$$= \sigma_n^2 * N \tag{26-3}$$

Thus, regarding Equation (25-6), a relational expression according to Equation (27-1) to Equation (27-3) given below is established using Equation (25-1) and Equation (26-3); and Equation (28-1) to Equation (28-4) are derived.

$$\overline{(Jn0 * S0) * (Jn0 * S0)'} \tag{27-1}$$

$$= (\sigma_n^2 * N) * N \tag{27-2}$$

$$= \overline{(Jn0 * Jn0')} * N \tag{27-3}$$

$$Pn00 = \overline{\left(\frac{Jn0}{\sqrt{N}} * S0\right) * \left(\frac{Jn0}{\sqrt{N}} * S0\right)'} \tag{28-1}$$

$$= \overline{Jn00 * Jn00'} \tag{28-2}$$

$$= \overline{Jn0 * Jn0'} \tag{28-3}$$

$$= Pn0 \tag{28-4}$$

In this way, the noise output average power Pn00 of a virtual array is equivalent to the noise average power Pn0 in the case of a real array, and the noise output vector of a virtual array is expressed as given below in Equation (29).

$$Jn00 = \left(\frac{Jn0}{\sqrt{N}}\right) * S0 \tag{29}$$

Thus, the output vector JSn00 of a virtual array antenna is expressed as given below in Equation (30-1) to Equation (32).

$$JSn00 = AG_s * S0 + \left(\frac{Jn0}{\sqrt{N}}\right) * S0 \tag{30-1}$$

$$= AG_{sn} * S0 \tag{30-2}$$

$$AG_{sn} = AG_s + AG_n \tag{31}$$

$$AG_n = \frac{Jn0}{\sqrt{N}} \tag{32}$$

Based on the analysis described above, the ratio PS0/Pn0 of the signal power against the noise average power in the real array output vector is equivalent to the ratio PS0/Pn00 in the virtual array output vector. Moreover, according to Equation (30-2), the relational expression (a singular linear equation) of AGsn*S0, which generates the output vector JSn00 of the virtual array antenna, is obtained.

Meanwhile, the output vector JSn00 of the virtual array antenna given in Equation (30-1) can be generated from the actually-obtained data according to the following method. Firstly, the time is varied with respect to the same signal incoming waves, and actual measurement data of the output vectors of two actual array samples (referred to as JSn0 and JSn0₁ as given in Equation (33) and Equation (34), exp(jβ) is phase shift caused by difference of measurement timing, respectively) is collected; and a relational expression according to Equation (35) is obtained.

$$JSn0 = AG_s * S0 + Jn0 \tag{33}$$

$$JSn0_1 = \exp(j\beta) * AG_s * S0 + Jn0_1 \tag{34}$$

$$\exp(-j\beta) * JSn0_1 = AG_s * S0 + Jn0_1 \tag{35}$$

Subsequently, as the sample data of the output noise vectors of the reception systems connected to all array elements, a single set of sample data of $Jn0_2$ is collected in the state in which there are no signal incoming waves (the state of no transmission using the DEF radar). Moreover, Jn00 that constitutes Equation (36) of the virtual-array-antenna-induced output vector JSn00 is generated using the noise data $Jn0_2$ as given in Equation (37).

$$JSn00 = AG_s * S0 + Jn00 \tag{36}$$

$$Jn00 = \left(\frac{Jn0_2}{\sqrt{N}}\right) * S0 \tag{37}$$

Herein, in place of the noise output sample data $Jn0_2$ given in Equation (37), different sample data having the same statistical nature of noise can be alternatively used as the noise output sample data $Jn0_2$.

Subsequently, with respect to the output vector $JSn00$, a provisional value $JSn00z$ obtained according to the actual measurement data is configured as given below in Equation (38-1) to Equation (38-4).

$$JSn00z = (AG_s * S0 + Jn0) - Jn0_1 + \left(\frac{Jn0_2}{\sqrt{N}}\right) * S0 \tag{38-1}$$

$$= JS0 - (Jn0_1 - Jn0) + \left(\frac{Jn0_2}{\sqrt{N}}\right) * S0 \tag{38-2}$$

$$= JS0 + \left(\frac{Jn0_2}{\sqrt{N}}\right) * S0 - \left(\begin{array}{c} \exp(-j\beta) * \\ JSn0_1 - JSn0 \end{array}\right) \tag{38-3}$$

$$= JSn00 - (\exp(-j\beta) * JSn0_1 - JSn0) \tag{38-4}$$

Consequently, in $JSn00z$ obtained in the equations given above according to the actual measurement data, when $(\exp(-j\beta)*JSn0_1-JSn0)$ derived as the actual measurement value according to Equation (35) is subtracted from both sides, the output vector $JSn00$ of the virtual array antenna given in Equation (30-1) to Equation (32) is obtained using Equations (39-1) and (39-2) given below.

$$JSn00 = JSn00z + (\exp(-j\beta) * JSn0_1 - JSn0) \tag{39-1}$$

$$= AG_{sn} * S0 \tag{39-2}$$

Herein, the initial real-array-induced output vector $JSn0=AGs*S0+Jn0$ includes the noise output vector $Jn0$ that is unrelated to the fundamental reception matrix $S0$ of the array antenna 1; and the fundamental reception matrix $S0$ is a singular matrix. Hence, it is a difficult to obtain the amplitude vector $AGs$ of the desired signal incoming waves.

In regard to that, in the first embodiment, as given in Equations (30-1) and (30-2), the noise output vector $Jn0$ is treated as virtual noise incoming waves and is coupled with $S0$. As a result, it becomes possible to treat the noise output vector $Jn0$ in the same manner as the complex amplitude vector $AGs$ of the signal incoming waves, and thus it results in the formation of linear equations related to the unknown vector $AGsn$.

However, in the linear equations given in Equations (30-1) and (30-2), since the coefficient matrix $S0$ is a singular matrix, reversibility is not established, and thus the cause amount $AGsn$ cannot be accurately obtained from the result amount $JSn00$.

In that regard, in the first embodiment, the primary approximate value calculating unit 6b and the secondary approximate value calculating unit 6c are used to obtain a practicably accurate approximate value of the unknown vector $AGsn$ in the singular linear equation given in Equation (30-2), and the synthesizing unit 6d synthesizes the result. The relevant method is explained below.

Calculation of Primary Approximate Value

Firstly, the explanation is given about the calculation of the primary approximate value as performed by the primary approximate value calculating unit 6b.

In Equation (40) given below, Fundamental Equation (1) represents a singular linear equation given in Equation (30-2).

Fundamental Equation (1): $AG_{sn}*S0=JSn00$ (40)

In Equation (40), when the cause amount $AGsn$ is applied to the left-hand side, an achievement value $JSn00$ on the right-hand side is obtained. There, in the primary approximate value calculating unit 6b, using a pseudo inverse matrix $pinv(S0)$ of the matrix $S0$, a primary approximate solution $AGsnx1=JSn00*pinv(S0)$ of $AGsn$ is defined; the primary approximate solution $AGsnx1$ is applied to the left-hand side of Fundamental Equation (1); and the achievement value $JSn11$ of the primary approximation is obtained from the right-hand side of Equation (41). Moreover, at the same time, an error vector $dJSn00x1$ with respect to the target value $JSn00$ is set using Equation (42).

$$JSn00x1 = JSn00*pinv(S0)*(s0) \tag{41}$$

$$dJSn00x1 = JSn00 - JSn00x1 \tag{42}$$

Calculation of Secondary Approximate Value

Next, the explanation is given about the calculation of the secondary approximate value as performed by the secondary approximate value calculating unit 6c.

In the secondary approximate value calculating unit 6c, Fundamental Equation (2) in Equation (43) given below is set in which the error vector $dJSn00x1$, which is calculated by the primary approximate value calculating unit 6b, serves as the target value.

Fundamental Equation (2): $AG_{snx}2*S0=dJSn00x1$ (43)

In an identical manner to the calculation of the primary approximate value, the secondary approximate value calculating unit 6c obtains a secondary approximate value $AGsnx2=dJSn00x1*pinv(S0)$ of $AGsn$ and applies the secondary approximate value $AGsnx2$ in Equation (43) given above so that a secondary achievement value $dJSn00x2$ with respect to the target value $dJSn00x1$ on the right-hand side is obtained as given below in Equations (44-1) and (44-2). Herein, E represents a unit matrix of the same dimensionality as $S0$.

$$dJSn00x2 = AG_{snx}2 * S0 \tag{44-1}$$

$$= JSn00x1 * [E - pinv(S0) * S0] \tag{44-2}$$

Synthesizing Operation

Given below is the explanation of the calculation performed during a synthesizing operation by the synthesizing unit 6d. The synthesizing unit 6d refers to the calculation results obtained by the primary approximate value calculating unit 6b and the secondary approximate value calculating unit 6c, configures an approximation achievement value $JSn00x$ with respect to the achievement value $JSn00x1$ of the virtual array output vector as given below in Equation (45-1), and derives the approximation achievement value $JSn00x$ in the form of linear equations as given below in Equation (45-2) to Equation (45-5).

$$JSn00x = JSn00x1 + dJSn00x2 \quad (45\text{-}1)$$
$$= (AG_{snx1} + AG_{snx2}) * S0 \quad (45\text{-}2)$$
$$= JSn00 * Ws * pinv(S0) * S0 \quad (45\text{-}3)$$
$$= AG_{sn} * [S0 * Ws * pinv(S0) * S0] \quad (45\text{-}4)$$
$$= AG_{sn,mod} * S0_{mod} \quad (45\text{-}5)$$

Herein, the matrices are defined as given below in Equations (46) and (47).

$$Ws = [2E - pinv(S0) * S0] \quad (46)$$

$$S0_{mod} = [S0 * Ws * pinv(S0) * S0] \quad (47)$$

If the expansion related to JSn00x is compared to Fundamental Equation (1) in Equation (40), accompanying the change from the achievement target value JSn00 in Fundamental Equation (1) to the approximation achievement value JSn00x on the left-hand side in Equation (45-1), AGsn*S0 on the left-hand side of Fundamental Equation (1) changes to the right-hand side in Equation (45-4). Moreover, the reception matrix S0 in Fundamental Equation (1) changes to S0mod given in Equation (47).

Figure 10:
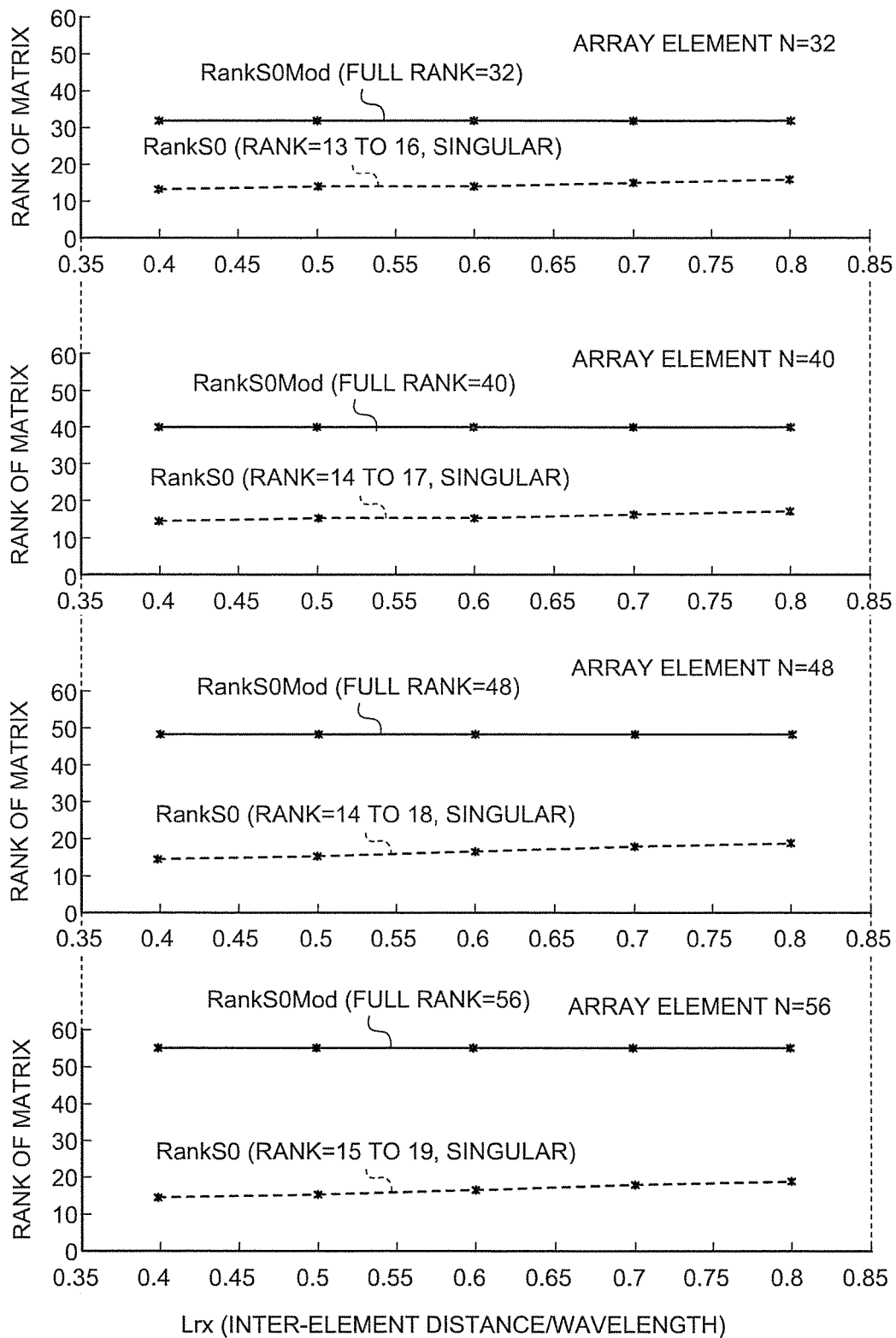
FIG. 10 is a diagram illustrating an example of the rank of a coefficient matrix S0mod, which is obtained using a fundamental reception matrix S0 and the calculation during quantized narrow beam forming on the elevation plane, in relation to the element spacing/wavelength and the number of array elements.

Herein, the rank of S0mod was calculated. FIG. 10 is a diagram illustrating an example of the rank of the coefficient matrix S0mod, which is obtained using the fundamental reception matrix S0 and the calculation during quantized narrow beam forming on the elevation plane (θ plane), in relation to the inter-element distance/wavelength and the number of array elements. In FIG. 10 are illustrated cases when the array element number N is equal to 32, 40, 48, and 56. The horizontal axis represents Lrx (element spacing/wavelength=Lsx/λ), and the vertical axis represents the rank of the matrix. As illustrated in FIG. 10, the rank of the matrix S0 about 15, and regarding the coefficient matrix S0mod, in a relatively wide range of Lsx/λ and the array element number, the rank represents a full rank and the coefficient matrix S0mod is a non-singular matrix. Accordingly, Equation (45-5) is a non-singular linear equation. Meanwhile, in Equation (45-5), in order to differentiate from the initial setting value AGsn, it is substituted by AGsn,mod. In this virtual array, the complex amplitude vector AGsn,mod of the incoming waves is expressed as given below in Equation (48).

$$AG_{sn,mod} = JSn00x * inv(S0_{mod}) \quad (48)$$

Meanwhile, even according to the method described below in which the derived non-singular matrix S0mod is used, it is possible to form quantized narrow beams. Firstly, a matrix is formed in which the column vectors of a DFT operator matrix (having the size L=Mx, and having orthogonality among column vectors or row vectors), and an augmented matrix SL (MxxN*L) is configured in which the abovementioned matrix is continuous in the row direction regarding the total number L. The matrix S0mod is weighted by each row vector of DFT operator matrix in order, and then the weighted S0mod matrix is link in row direction by L=N times. With such a configuration, the augmented matrix SL has orthogonality among row vectors. Meanwhile, regarding an array output vector JSL in the augmented matrix SL, as a result of coupling of the incoming wave amplitude vector AGsn and the augmented matrix SL, a vector is formed in which AGsn(m) is weighted with respect to an arbitrary #m row vector in the augmented matrix SL and this vector is added for the total number Mx so that the resultant value represents the array output vector JSL. Herein, in an identical manner to the beam forming in a normal array antenna, with the #mm row vector (mm=1 to Mx) in the augmented matrix serving as the steering vector, the inner product with the augmented array output vector JSL is calculated. When the incoming wave number m matches with the steering vector number mm, the amplitude output AGsn(mx) unique to the incoming wave number is output. On the other hand, when the incoming wave number m does not match with the steering vector number mm, the output is equal to zero due to the inter-vector orthogonality. Thus, as a result of calculating the inner product by sequentially changing the steering vector, all incoming wave amplitudes can be detected according to the quantized narrow beams.

Moreover, in the incoming-wave complex amplitude vector operation detecting unit 6e; the detected signal number, the incoming angle, and the signal strength information can be obtained from the constituent elements of the complex amplitude vectors AGsn,mod of the incoming waves as calculated and detected corresponding to various SN ratios in the output vectors of the real array and the virtual array.

Meanwhile, although the explanation given above is about the sequence of data processing for quantized narrow beam forming on the θ plane, identical operations can be performed regarding the φ plane too. As a result, quantized narrow beam forming can be achieved on the θ plane and the φ plane, and the reception incoming waves within the T/R beam can be detected at each quantized unit angle.

Calculation Result 1

Given below is the explanation of a calculation result of the sequence of data processing described above.

Figure 4A:
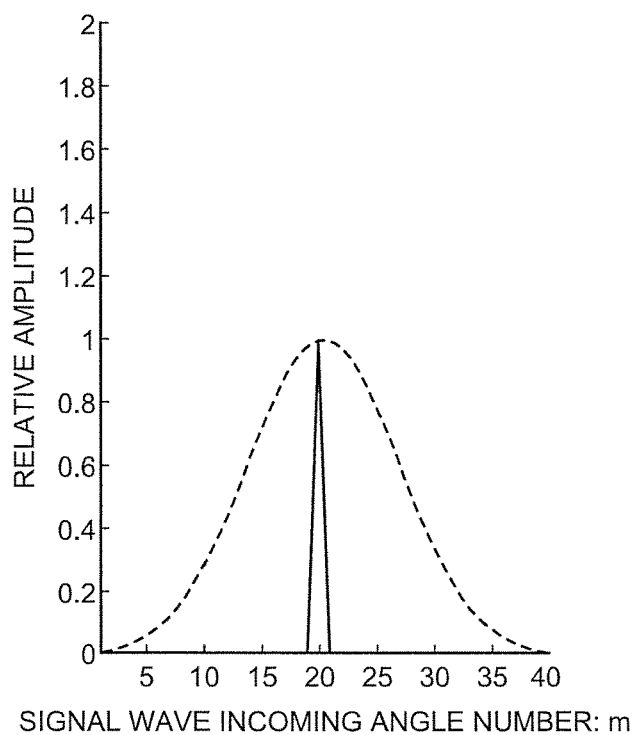
FIG. 4A is a diagram illustrating a typical single incoming wave amplitude distribution in the case in which a reception incoming wave is received by each antenna element of a real array antenna.
Figure 4B:
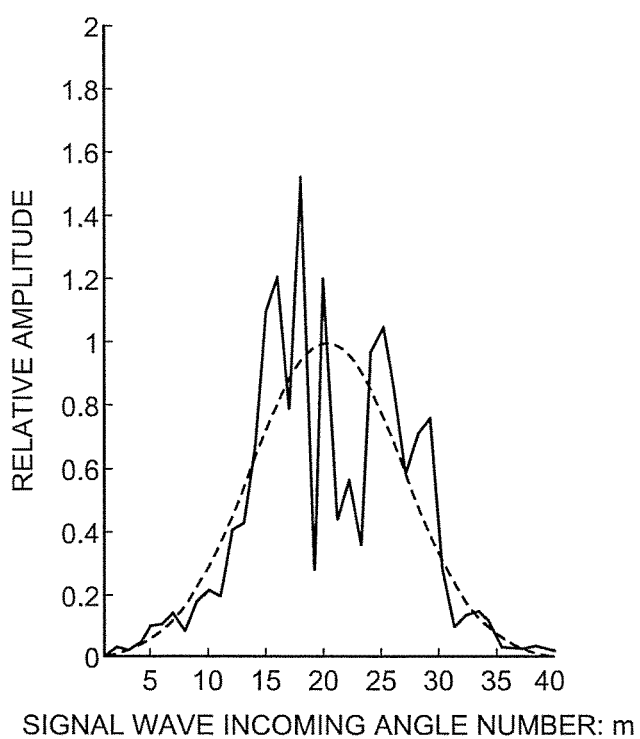
FIG. 4B is a diagram illustrating a typical plural incoming waves amplitude distribution in the case in which reception incoming waves are received by each antenna element of a real array antenna.

Firstly, FIG. 4 is a diagram illustrating a typical incoming wave amplitude distribution in the case in which the reception incoming waves are received by each antenna element of a real array antenna. Herein, the horizontal axis represents signal wave incoming angle numbers (division angle numbers). FIG. 4A represents a case in which a reference incoming wave of relative amplitude 1 arrives substantially at the central angle of the beams of the transceiving antenna, and a normalized antenna amplitude pattern (dotted line). FIG. 4B represents a case in which, as an event closer to reality, the effective value of random amplitude is 1 at the center of incoming angle and the phase of all incoming waves is uniformly distributed at (0, 2π), and the solid line represents an example of the signal incoming wave amplitude vector under the above-mentioned weight of a gain pattern.

Figure 5A:
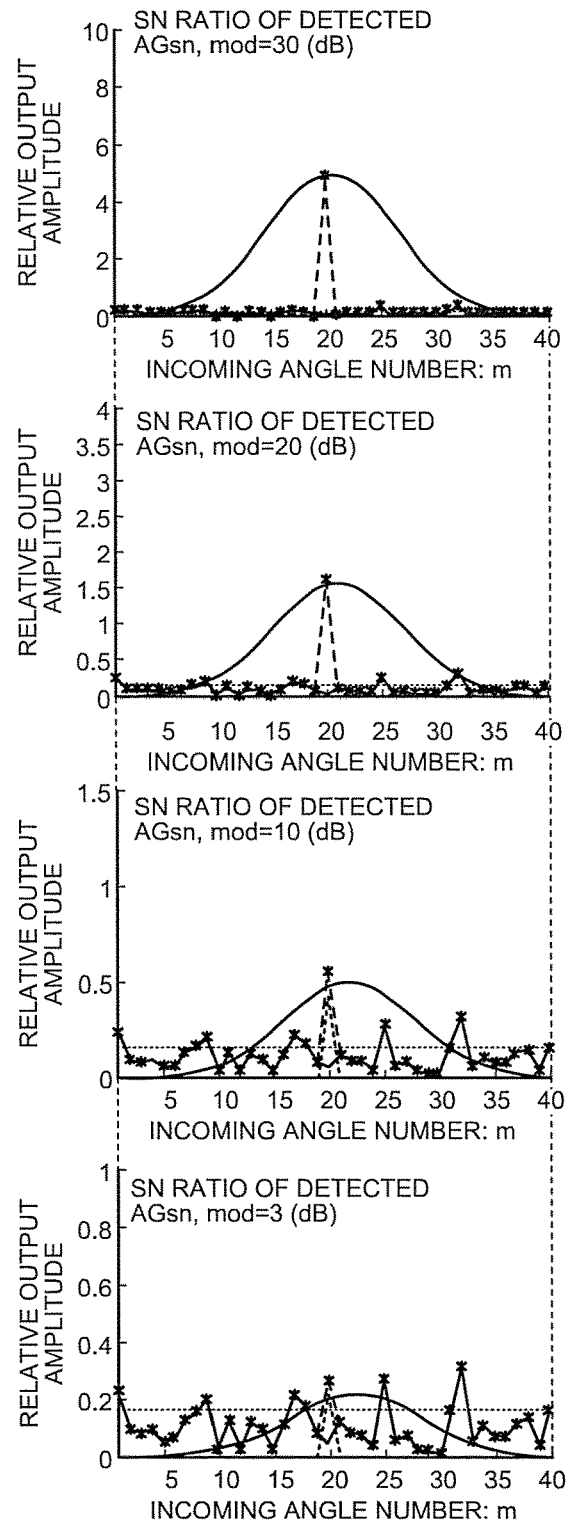
FIG. 5A is a diagram illustrating the relationship between the detected amplitude and the incoming angle in a corresponding manner to the changes in the SN ratio in the case in which quantized narrow beams are formed on the elevation plane with respect to the reception incoming waves illustrated in FIG. 4A.
Figure 5B:
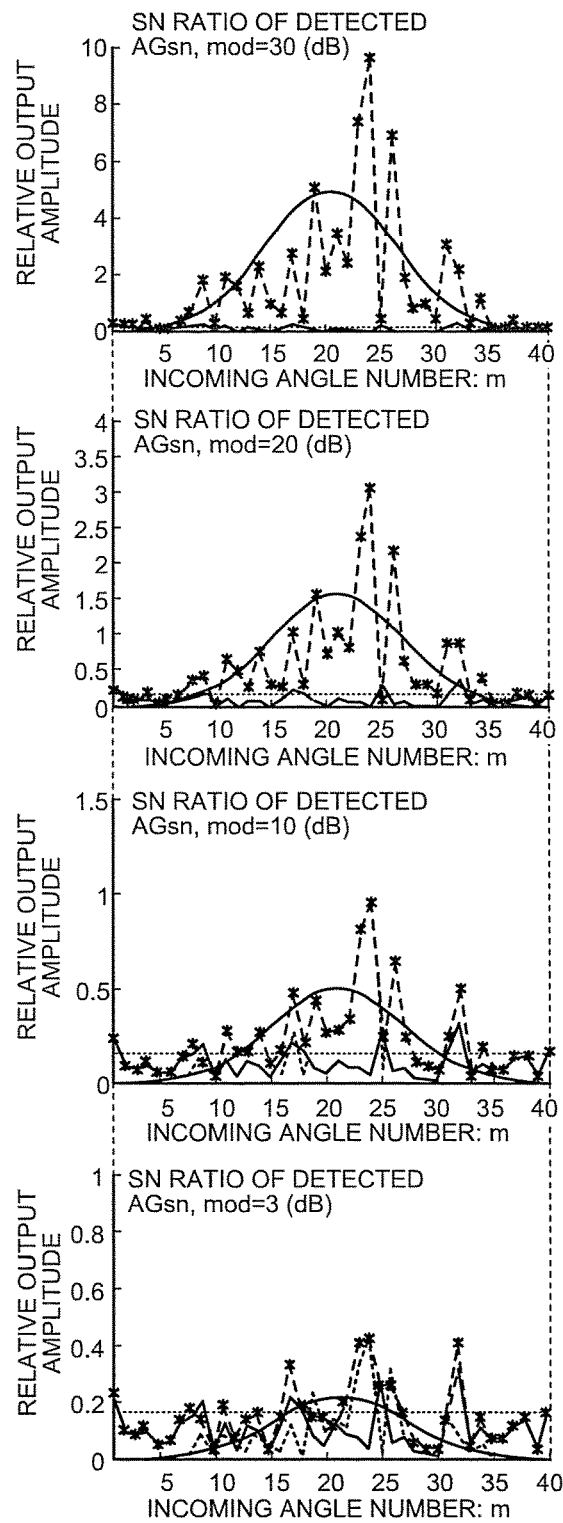
FIG. 5B is a diagram illustrating the relationship between the detected amplitude and the incoming angle in a corresponding manner to the changes in the SN ratio in the case in which quantized narrow beams are formed on the elevation plane with respect to the reception incoming waves illustrated in FIG. 4B.

FIGS. 5A and 5B are diagrams illustrating the relationship between the detected amplitude and the incoming angle via equation (48) in a corresponding manner to the changes in the SN ratio in the case in which quantized narrow beams are formed on the elevation plane (θ plane) with respect to the reception incoming waves illustrated in FIGS. 4A and 4B. More particularly, in FIG. 5 is illustrated the detection result in the case of setting and providing the incoming wave amplitude vector AGsn of the virtual array during the operations performed by the virtual-array-induced quantized-multiple/narrow beam forming unit 6 illustrated in FIG. 3 according to the SN ratio defined regarding the reference wave of a single effective amplitude at the transmission antenna gain maximum point (the beam center). FIG. 5A represents the detection result AGsn,mod of the single reference wave, while FIG. 5B represents the detection result of a random amplitude wave.

Under the noise output level of the virtual array antenna having a certain effective amplitude illustrated as the dotted line, since the initial setting value AGsn of the amplitude vector of ((the signal wave)+(virtual noise wave)) closely matches with the calculated detection vector AGsn,mod, the dashed line is illustrated in an overlapping manner at a number of places. At that time, the SN ratio of the detected AGsn,mod is equivalent to the SN ratio of the initial real array output vector JSn0. As a result, it is confirmed that the quantized-multiple/narrow beam forming method implemented by the virtual-array-induced quantized-multiple/narrow beam forming unit 6 is effective.

Moreover, in FIG. 5A as well as FIG. 5B, between 30 dB to 10 dB of the SN ratio, the calculated detection vector AGsn,mod is relatively closely matching with the amplitude vector AGs (short dashed line) of the signal incoming waves included in AGsn,mod. However, when the SN ratio becomes equal to or smaller than 10 dB, the amplitude of the noise incoming waves AGn included in the detected value AGsn,mod gradually increases and the estimate accuracy of the signal wave AGs included in the AGsn,mod gradually decreases. Meanwhile, the estimated amplitude rate of the embedded signal waves with respect to the detected amplitude value AGsn,mod is largely at about $[(SN\ ratio)/(SN\ ratio+1)]^{0.5}$, and it is estimated that there is an average decrease of 0.95 times at the SN ratio of 10 dB (=10/1) and an average decrease of 0.82 times at the SN ratio of 3 dB (=2/1). As a measure against this phenomenon, a combination with a DFT filter (described later) is effective in achieving improvement. Meanwhile, the solid curved line illustrated in FIGS. 5A and 5B represents the beam output which is illustrated for each quantized unit angle and which is obtained by taking the inner product of the steering vector and the output vector of the real array antenna at each quantized unit angle according to the conventional beam forming method implemented in an array antenna. When only a single wave is present in the beam, it results in the normal formation pattern of the array antenna; and, only when it is clear in advance that there is a single incoming wave, it becomes possible to estimate the incoming angle and the amplitude at the peak position of the output pattern. On the other hand, when a plurality of waves (M number of waves at the maximum) of random complex amplitudes is present in the beam, the inner product is calculated as the summation vector of a single wave, and the information on the incoming angle and the amplitude of the individual incoming waves becomes unclear as a result.

Figure 6A:
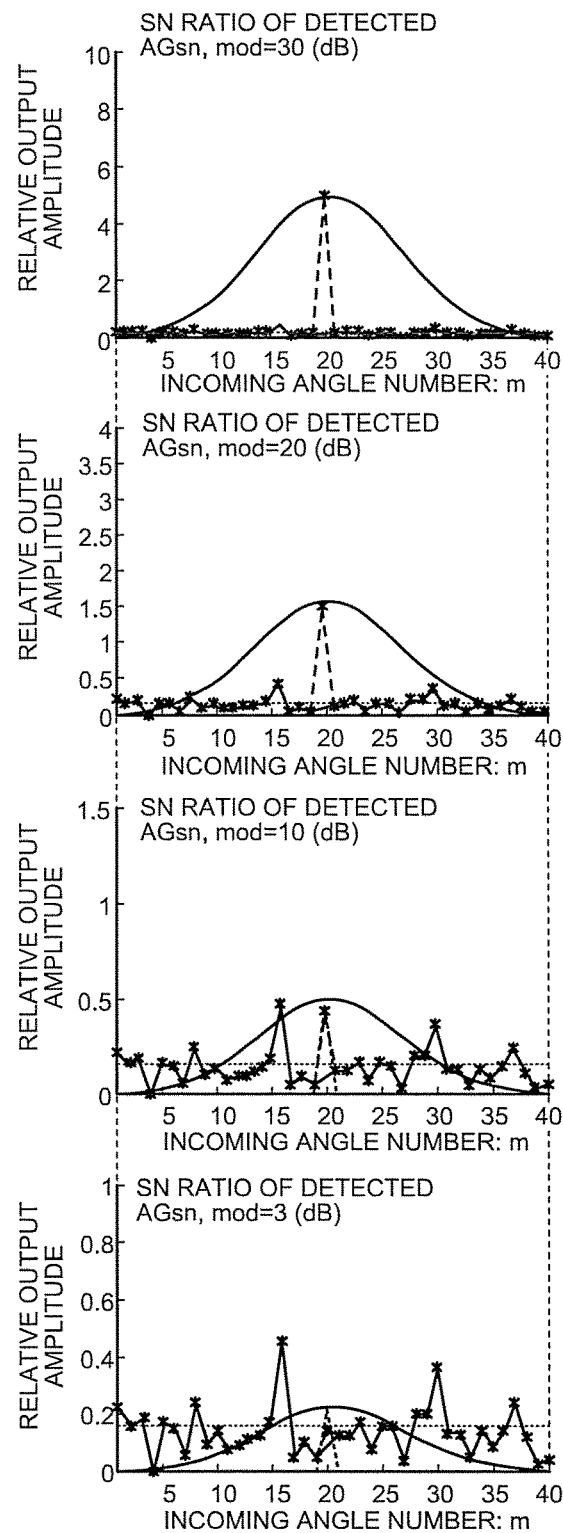
FIG. 6A is another example of diagram illustrating the relationship between the detected amplitude and the incoming angle in a corresponding manner to changes in the SN ratio in the case in which quantized narrow beams are formed on the azimuth plane with respect to the reception incoming waves illustrated in FIG. 4A.
Figure 6B:
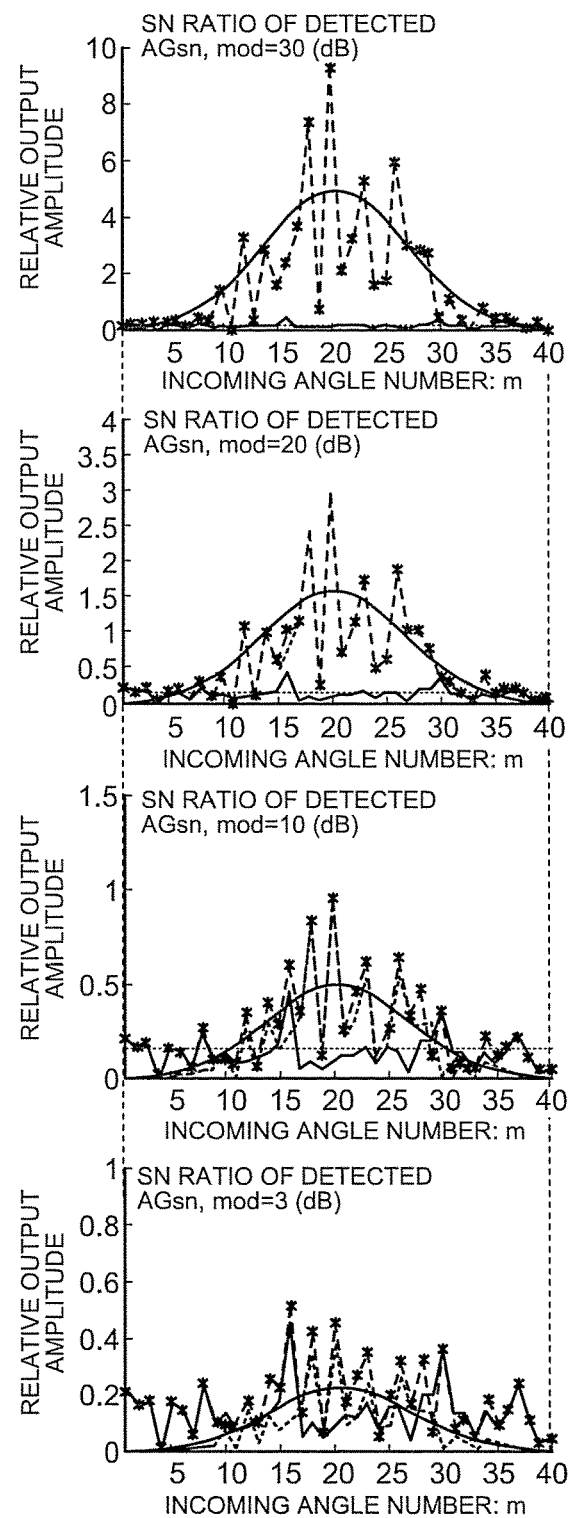
FIG. 6B is another example of diagram illustrating the relationship between the detected amplitude and the incoming angle in a corresponding manner to changes in the SN ratio in the case in which quantized narrow beams are formed on the azimuth plane with respect to the reception incoming waves illustrated in FIG. 4B.

FIGS. 6A and 6B are diagrams illustrating the relationship between the detected amplitude and the incoming angle in a corresponding manner to changes in the SN ratio in the case in which quantized narrow beams are formed on the azimuth plane ($\phi$ plane) with respect to the reception incoming waves illustrated in FIGS. 4A and 4B. More particularly, FIGS. 6A and 6B illustrate an example of the result of forming quantized narrow beams on the $\phi$ plane by implementing an identical method to that implemented in the case of the $\theta$ plane and by treating the array output vector JSn0f on the azimuth $\phi$ axis given in Equation (18-3) as the starting point. FIGS. 6A and 6B indicate that the narrow beams are formed in an identical manner to the beam forming on the $\theta$ plane as illustrated in FIGS. 5A and 5B and that each incoming wave is separated and detected. Meanwhile, the estimate accuracy of the signal wave amplitude included in the detection vector AGsn,mod is equivalent to the case illustrated in FIG. 5. As a result of integration in Equation (49) given below using the incoming wave amplitude vectors AGsn,mod $\theta$ and AGsn,mod $\phi$ that are independently obtained at the two-dimensional angle ($\theta$, $\phi$) mentioned earlier, it becomes possible to estimate the incoming wave amplitude of the quantized narrow beams in an incoming angle matrix ($\theta$mx, $\phi$my).

$$AG_{sn,mod}(\theta_{mx},\phi_{mx})=\{AG_{sn,mod}\theta(\theta_{mx})*AG_{sn,mod}\phi(\phi_{mx})\}^{0.5} \quad (49)$$

Meanwhile, as given in Equation (14-3), when $\theta_0=0$ and $\phi_0=0$ holds true in the precise sense, even if the quantized incoming angle $\phi$my on the $\phi$ plane undergoes a change, the phase becomes equal to zero (because $\sin(\theta_0)*\sin(\phi_0)=0$ holds true). Hence, narrow beams cannot be formed. However, after diagonal loading of a very small value (such as a value in the order of $10^{-6}$) is applied with respect to S0mod $\phi$ obtained according to Equation (47) and a non-singular matrix is obtained as a result, S0mod $\phi$ is replaced with the non-singular matrix so that a normal result can be obtained. Meanwhile, E represents a unit matrix of the same size as Smod $\phi$. The diagonal loading can be implemented with respect to S0mod on the $\theta$ axis too according to the same method, and non-singular S0mod can be thus maintained on a constant basis.

$$S0_{mod}\phi=S0_{mod}\phi+10^{-6}*E \quad (50)$$

Operations in Frequency Domain

Figure 7:
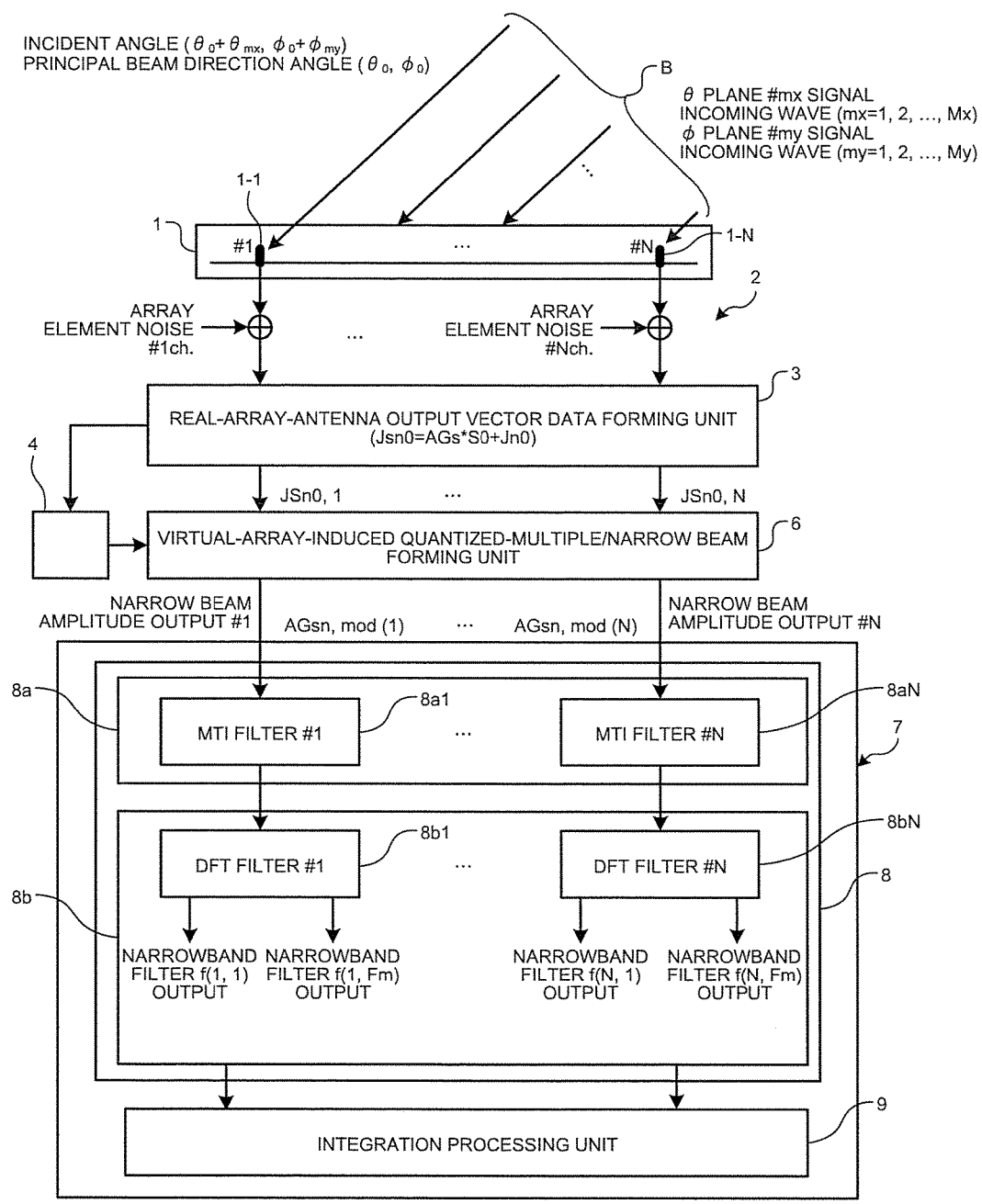
FIG. 7 is a diagram for explaining a case of performing operations in the frequency space in the radar system according to the first embodiment.

Given below is the explanation of the operations performed in the frequency space in addition to the operations performed in the angle space in the radar system 100 according to the first embodiment. FIG. 7 is a diagram for explaining a case of performing operations in the frequency space in the radar system 100. Meanwhile, regarding the array antenna 1, the T/R unit 2, the real-array-antenna output vector data forming unit 3, the real-array-induced digital beam forming-and-processing unit 4, and the virtual-array-induced quantized-multiple/narrow beam forming unit 6 that is included in the virtual-array-induced quantized-multiple/narrow beam forming-and-managing unit 5 in FIG. 1; the configuration and the behavior is identical to the operations performed in the angle domain as described above. Hence, that explanation is not repeated. The following explanation is mainly given about the configuration and the behavior of the frequency spectrum processing unit 8.

The frequency spectrum processing unit 8 includes an MTI filter unit 8a and a DFT filter unit 8b. The MTI filter unit 8a further includes MTI filters 8a1 to 8aN, while the DFT filter unit 8b further includes DFT filters 8b1 to 8bN.

Firstly, element data (AGsn,mod(1), . . . , AGsn,mod(N)), which constitutes the incoming wave amplitude AGsn,mod that is obtained by the virtual-array-induced quantized-multiple/narrow beam forming unit 6 according to the quantized-multiple/narrow beam operation method, is input to the frequency spectrum processing unit 8 for each incoming wave output channel.

In the frequency spectrum processing unit 8, the MTI filters 8a1 to 8aN of the MTI filter unit 8a have the function of suppressing unnecessary clutter mixed in the incoming waves.

Figure 8:
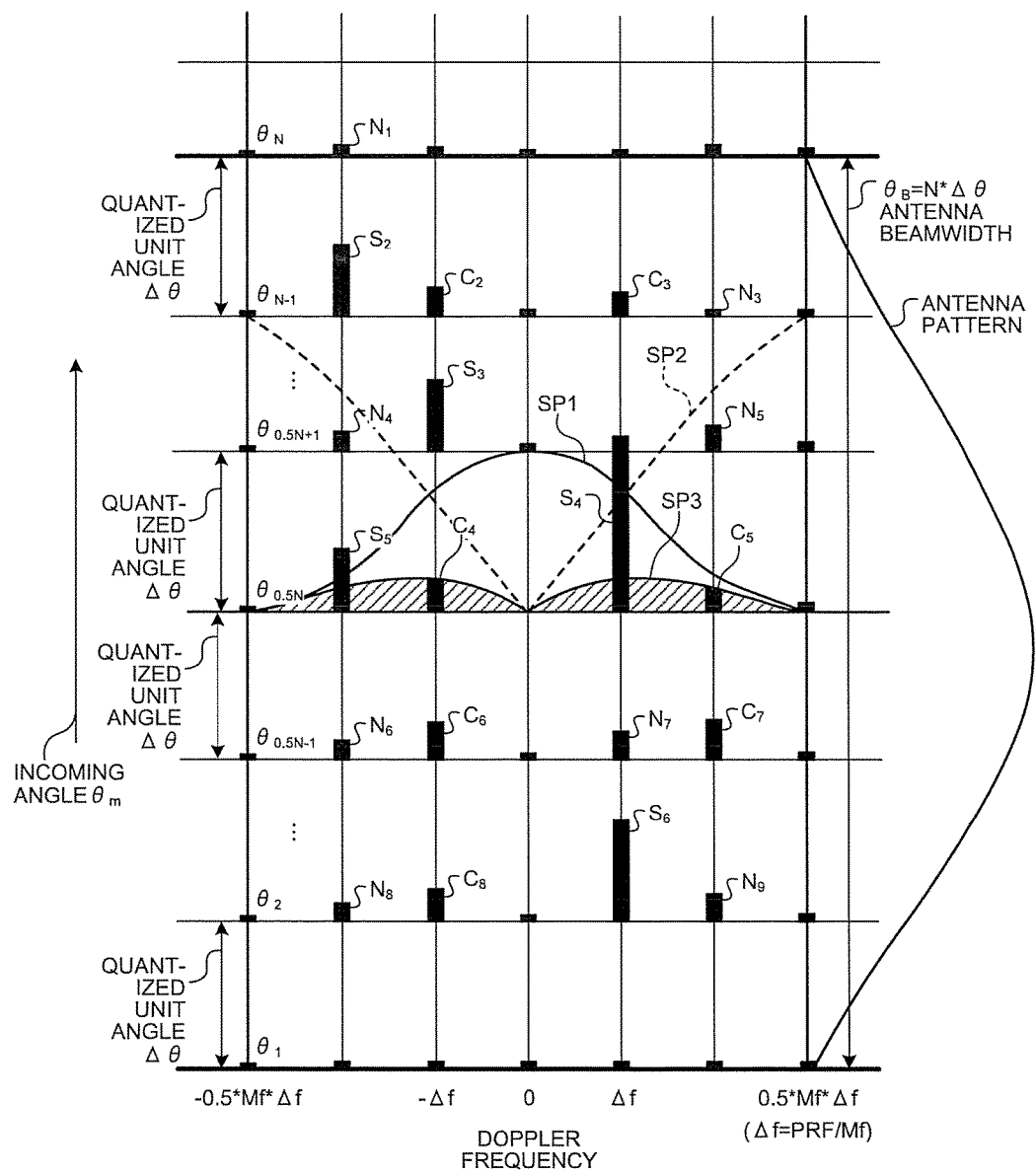
FIG. 8 is a conceptual diagram illustrating the operations and the effect of combination signal processing of the angle space and the frequency space in the quantized-multiple/narrow beam forming method implemented within the T/R beamwidth illustrated in FIG. 7.

FIG. 8 is a conceptual diagram illustrating the operations and the effect of combination signal processing of the angle space and the frequency space in the quantized-multiple/narrow beam forming method implemented within the transceiving beamwidth illustrated in FIG. 7. Herein, the horizontal axis represents the Doppler frequency of the reflected waves from the target object, and the reflected waves are assigned to the DFT filters 8b1 to 8bN. The vertical axis represents the incoming angle $\theta$m at each quantized unit angle $\Delta\theta$. Herein, it is assumed that the antenna beamwidth $\theta_B=N*\Delta\theta$ holds true. Moreover, "S" represents the target signal, "C" represents the clutter, "N" represents the noise, and PRF represents the pulse repetition frequency of the transceiving signal.

Herein, the frequency spectrum components of the unnecessary clutter mixed in the incoming waves is concentrated in the low-frequency area including zero, such as in a frequency spectrum SP1 illustrated with a solid line in FIG. 8. Meanwhile, the MTI filters 8a1 to 8aN are configured to have the low-frequency suppression filter characteristics as seen in a frequency spectrum SP2. As a result, using the fact that the frequency spectrum SP1 of the clutter is concentrated in the low-frequency area including zero, the MTI filters 8a1 to 8aN suppress the frequency spectrum SP1 as seen in a frequency spectrum SP3 illustrated with hatched lines in FIG. 8 (for example, see $C_4$ and $C_5$ of the clutter). Meanwhile, depending on the state of clutter reception, the signal path can be switched so as to bypass the MTI filter unit 8a.

Subsequently, the output data of the MTI filters 8a1 to 8aN that contains residual clutter is input to the DFT filters 8b1 to 8bN each of which has the number of points Fm and is configured with Fm number of narrowband filters. As a result, the frequency spectrum component of the output data of the MTI filters 8a1 to 8aN is output upon being separated/dispersed on the Fm number of narrowband filters matching with the frequency spectrum component. When signals, residual clutter, and noise is input to the DFT filters 8b1 to 8bN, the SN ratio improves by Fm times in the corresponding narrowband filter output. That is because of the fact that the noise is output upon being separated/dispersed from the Fm number of narrowband filters. Moreover, at the same time, since the residual clutter components that expand in the frequency spectrum are also dispersed among the narrowband filters, the clutter power per narrowband filter decreases and the SC ratio (the ratio of the signal power S against the clutter power C) improves, thereby resulting in enhancement in the signal detection capacity.

Lastly, in the integration processing unit 9, the narrow-band spectrum information output from the N number of DFT filters 8b1 to 8bN is compared with the noise or with a threshold value based on the residual clutter so that the target signals of interest are detected, and useful target information such as the high-precision incoming angle, the signal strength, and the movement rate is obtained.

As described above, according to the first embodiment, a plurality of incoming waves in the transceiving beam can be separated at each quantized unit angle; the reception power of unnecessary clutter can be reduced by forming narrow beams in transceiving beam; and a high-resolution radar capable of individually detecting the incoming angle and the reception strength of each signal incoming wave can be implemented. The radar system 100 according to the first embodiment can be fixed on the ground or can be installed on a mobile vehicle, and is capable of search and monitor the front angle area in which performance of synthetic aperture radar is degraded. As a result, the angular resolution capability can be enhanced without having to expand the aperture dimension of the antenna. Hence, it becomes possible not only to obtain accurate target images that were not obtainable in a conventional DBF radar, but also to significantly enhance the capacity to collect target information such as the number of detected targets, the incoming angles of the target signals, the signal strength, and the Doppler-frequency-based movement rate.

Second Embodiment

Given below is the explanation of a radar system according to a second embodiment of the present invention. The radar system according to the second embodiment is assumed to include a planer array antenna having the arrangement of a plurality of linear array antennas in which a plurality of antenna elements is arranged.

Figure 9:
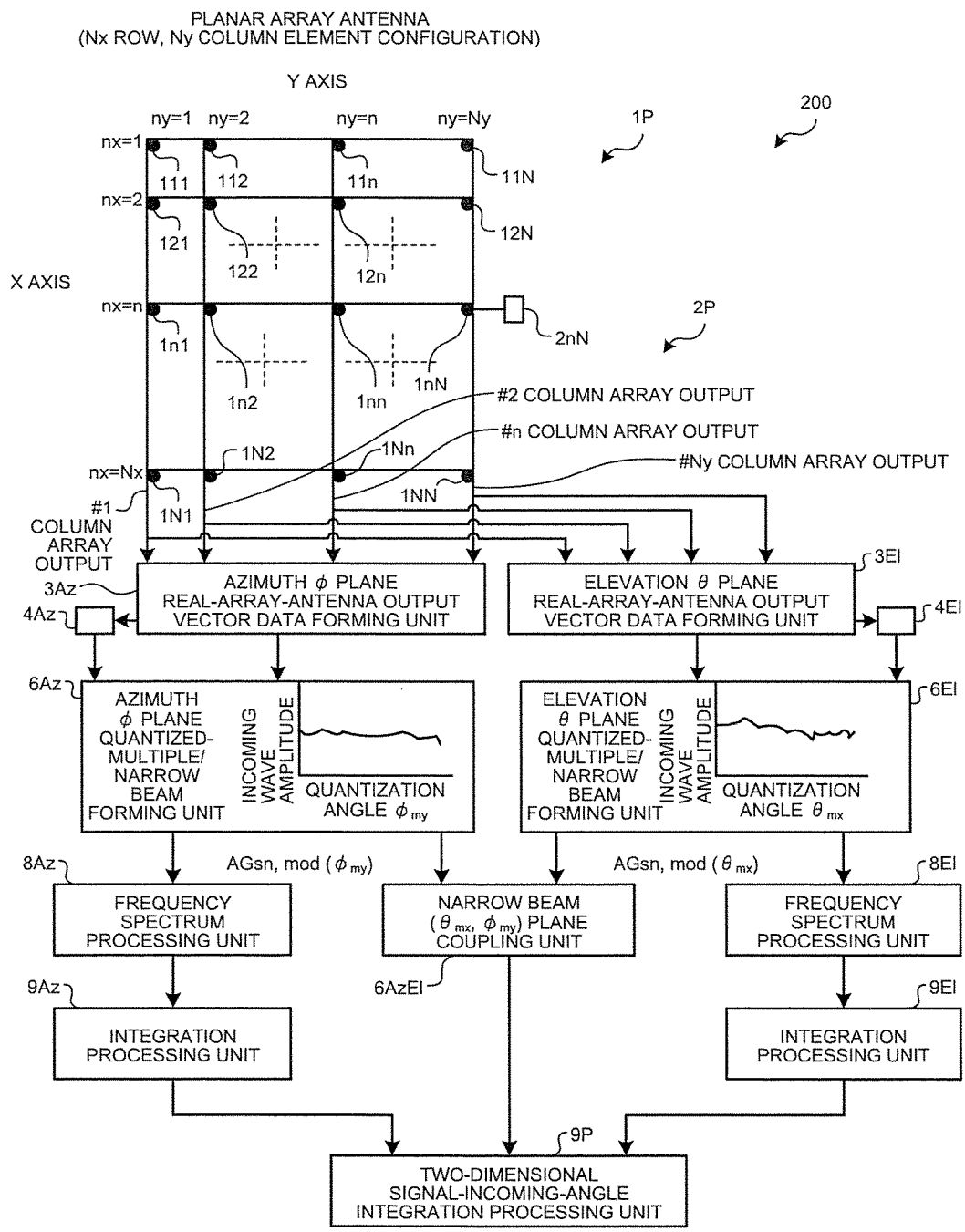
FIG. 9 is a configuration diagram of the main parts of a radar system according to a second embodiment for a planar array antenna.

FIG. 9 is a configuration diagram of the main parts of the radar system according to the second embodiment. As illustrated in FIG. 9, a radar system 200 constitutes a DBF radar system and includes the following: an array antenna 12; a T/R unit 2P; real-array-antenna output vector data forming units 3Az and 3El; real-array-induced digital beam forming-and-processing units 4Az and 4El; virtual-array-induced quantized-multiple/narrow beam forming units 6Az and 6El; a narrow beam ($\theta$, $\phi$) plane coupling unit 6AzEl; and frequency spectrum processing units 8Az and 8El, integration processing units 9Az and 9El, and a two-dimensional signal-incoming-angle integration processing unit 9P that constitute a processing unit. Herein, the virtual-array-induced quantized-multiple/narrow beam forming units 6Az and 6El; the narrow beam ($\theta$, $\phi$) plane coupling unit 6AzEl; and the processing unit constitutes a-virtual-array-induced quantized-multiple/narrow beam forming-and-managing unit serving as a quantized-multiple/narrow beam forming device.

The array antenna 1P is a planer array antenna in which a plurality of (Ny number of) linear array antennas, each of which having Nx number of antenna elements (where Nx is an integer equal to or greater than two) linearly arranged in the X-axis direction, are arranged in the Y-axis direction; and includes antenna elements 111 to 1NN. Herein, the antenna elements have element numbers (1, 1) to (Nx, Ny) assigned thereto as illustrated in FIG. 9.

The T/R unit 2P includes T/R modules that are connected to the antenna elements of the array antenna 1P. In FIG. 9, only the T/R module 2nN connected to the antenna element 1nN is illustrated. Such T/R modules have an identical configuration to the T/R modules 2-1 to 2-N according to the first embodiment.

The output from the T/R unit 2P is output for transmission, to each linear array antenna arranged on the Y-axis, and also output to the real-array-antenna output vector data forming units 3Az and 3El. That is, the output from the T/R unit 2P is made of a #1 row array output to a #N row array output.

The real-array-antenna output vector data forming units 3Az and 3El form real-array-antenna output vector data on the azimuth $\phi$ plane and the elevation $\theta$ plane, respectively; and have an identical configuration to the real-array-antenna output vector data forming unit 3 according to the first embodiment. Similarly, the real-array-induced digital beam forming-and-processing unit 4Az and 4El perform real-array-induced digital beam forming and processing on the azimuth $\phi$ plane and the elevation $\theta$ plane, respectively; and have an identical configuration to the real-array-induced digital beam forming-and-processing unit 4 according to the first embodiment. Moreover, the virtual-array-induced quantized-multiple/narrow beam forming units 6Az and 6El perform virtual-array-induced quantized-multiple/narrow beam forming on the azimuth $\phi$ plane and the elevation $\theta$ plane, respectively; and have an identical configuration to the virtual-array-induced quantized-multiple/narrow beam forming unit 6 according to the first embodiment. Furthermore, the frequency spectrum processing units 8Az and 8El perform frequency spectrum processing on the azimuth $\phi$ plane and the elevation $\theta$ plane, respectively; and have an identical configuration to the frequency spectrum processing unit 8 according to the first embodiment. Moreover, the integration processing units 9Az and 9El perform integration processing on the azimuth $\phi$ plane and the elevation $\theta$ plane, respectively; and have an identical configuration to the integration processing unit 9 according to the first embodiment.

The narrow beam (θ, φ) plane coupling unit 6AzEl provides the function of estimating the incoming wave amplitude at an arbitrary quantized angle θmx, φ my by performing calculation according to Equation (49) given earlier so as to couple the incoming wave amplitude vector AGsn,mod φ, which is detected by the virtual-array-induced quantized-multiple/narrow beam forming unit 6Az on the azimuth φ plane, with the incoming wave amplitude vector AGsn,mod θ, which is detected by the virtual-array-induced quantized-multiple/narrow beam forming unit 6El on the elevation θ plane. The two-dimensional signal-incoming-angle integration processing unit 9P receives the processing result from the integration processing units 9Az and 9El, and accordingly detecting the number of signals/the incoming angle (azimuth-elevation)/the signal strength/the Doppler frequency.

Given below is the explanation of the operations performed in the radar system 200. Firstly, regarding the incoming waves having amplitude 1 and attributed to the antenna element with an arbitrary element number (nx, ny), a reception amplitude Sxy(mx, my, nx, ny) is expressed as given below in Equations (51-1), (51-2), (52), and (53).

$$S_{xy}(mx, nx, ny) = Sx(mx, my, nx) * Sy(mx, my, ny) \quad (51\text{-}1)$$

$$= \exp\left[j*2\pi*\left(\frac{Lsx}{\lambda}\right)*\cos(\varphi_0 + \varphi_{my})* \atop \sin(\theta_0 + \theta_{mx})*(nx-1)\right] * \quad (51\text{-}2)$$

$$\exp\left[j*2\pi*\left(\frac{Lsy}{x}\right)*\sin(\theta_0 + \theta_{mx})* \atop \sin(\varphi_0 + \varphi_{my})*(ny-1)\right]$$

$$Sx(mx, my, nx) = \quad (52)$$
$$\exp\left[j*2\pi*\left(\frac{Lsx}{\lambda}\right)*\cos(\varphi_0 + \varphi_{my})*\sin(\theta_0 + \theta_{mx})*(nx-1)\right]$$

$$Sx(mx, my, ny) = \quad (53)$$
$$\exp\left[j*2\pi*\left(\frac{Lsy}{x}\right)*\sin(\theta_0 + \theta_{mx})*\sin(\varphi_0 + \varphi_{my})*(ny-1)\right]$$

The parameters in the equations given above are as follows.

element number on the x-axis: nx=1 to Nx element number on the y-axis: ny=1 to Ny incoming wave number on the elevation θ plane within a transceiving beam: mx=1 to Mx incoming wave number on the azimuth φ plane within a transceiving beam: my=1 to My $\theta_0$: center direction angle of the incoming wave on the elevation plane (the direction angle of the transceiving beam on the elevation plane)

θmx: #mx incoming wave angle in beam width $\theta_B$ representing the shift angle from the beam direction angle $\theta_0$ $\varphi_0$: center direction angle of the incoming wave on the azimuth plane (the direction angle of the transmission beam on the azimuth plane)

φmy: #my incoming wave angle in beam width $\varphi_B$ representing the shift angle from the beam direction angle $\varphi_0$ Upon receiving the signal incoming wave amplitude AGs(mx,my), an array output amplitude vector JSx(mx, my), which is output from the linear array antenna having Nx number of antenna elements on the X-axis as illustrated in FIG. 9, can be expressed as given below in Equation (54) as a general expression.

$$JS_x(mx,my)=AG_s(mx,my)*\{S_x(mx,my,nx)\}_{nx=1,2,\ldots,Nx} \quad (54)$$

When a linear array antenna is commonly positioned at an arbitrary position (ny) on the Y-axis, since a phase weight Sy(mx, my, ny) is given before the output, the calculation given below in Equation (55-1) to Equation (55-3) is performed for cancelling the phase weight at each position ny on the Y-axis, and a summation vector at the same phase angle is calculated for all array rows.

$$JS_{xy}\left\{\sum_{ny=1}^{Ny} S_y(mx, my, ny)*[S_y(mx, my, ny)]^{-1}\right\}* \quad (55\text{-}1)$$
$$\{JS_x(mx, my, nx)\}_{nx=1,2,\ldots,Nx}$$

$$= S_y*Z_y*\{JS_x(mx, my, nx)\}_{nx=1,2,\ldots,Nx} \quad (55\text{-}2)$$

$$= N_y*JS_x \quad (55\text{-}3)$$

Herein, the array output vector JSx on the X-axis and the phase weight vector Sy are expressed as given below in Equation (56) to Equation (58). Moreover, AGs(mx, my) represents the two-dimensional amplitude of the signal incoming waves, and a suffix t represents transposition.

$$JS_x(mx,my)=AG_s(mx,my)*\{S_x(mx,my,nx)\}_{nx=1,2,\ldots,Nx} \quad (56)$$

$$S_y=[S_y(mx,my,1)S_y(mx,my,2)\ldots S_y(mx,my,Ny)] \quad (57)$$

$$Z_y=[S_y(mx,my,1)^{-1}S_y(mx,my,2)^{-1}\ldots S_y(mx,my,Ny)^{-1}]^t \quad (58)$$

The array output vector given in Equation (55-3) generates a real array output vector according to whether quantized narrow beams are to be formed on the θ plane or on the φ plane. Meanwhile, in the quantized narrow beam forming on the angle coordinate (θ, φ) in the planar array antenna illustrated in FIG. 9, it is possible to directly implement the abovementioned method implemented in the linear array antenna according to the first embodiment.

Case of Formation of Quantized Narrow Beams on θ Axis

According to the case of a linear array antenna, JSx given in Equation (55-3) is expressed using Equation (56) and, as a result of further summation related to mx and my, JSx is again expressed as given below in Equations (59-1) and (59-2). Herein, a phase weight vector C0x and a fundamental reception matrix S0xθ are expressed below in Equations (60) and (61), respectively.

$$JS_x = \sum_{mx=1}^{Mx}\sum_{my=1}^{My} AG_s(mx, my)*\{S_x(mx, my, nx)\}_{nx=1,2,\ldots,Nx} \quad (59\text{-}1)$$

$$= AG_s\theta*S0_x\theta*\text{diag}(C_{0x}) \quad (59\text{-}2)$$

$$C_{0x} = \left\{\exp\left[j*2\pi*\left(\frac{Lsx}{\lambda}\right)*\cos(\varphi_0)*\sin(\theta_0)*(nx-1)\right]\right\}_{nx=1,2,\ldots,Nx} \quad (60)$$

$$S0_x\theta(mx, nx) = \exp\left[j*2\pi*\left(\frac{Lsx}{\lambda}\right)*\cos(\varphi_0)*\sin(\theta_0)*\theta_{mx}*(nx-1)\right] \quad (61)$$

(mx=1,2,..., Mx; nx=1,2,..., Nx)

In Equation (59-2) given above, $C_0x$ represents the phase weight with respect to S0xθ. Hence, in order to cancel the phase weight $C_0x$, the calculation given below in Equations (62-1) and (62-2) is performed.

$$JS0_x\theta = JS_x * inv(\text{diag}(C_{0x})) \quad (62\text{-}1)$$
$$= AG_s\theta * S0_x\theta \quad (62\text{-}2)$$

If a noise output vector is added to Equation (62-2), the array output vector to be used for the purpose of narrow beam forming on the θ plane in the planar array antenna is obtained as given below in Equation (63) according to Equation (13-3).

$$JSn0_{xy}\theta = Ny * JS0_x\theta + \sqrt{Ny} * Jn0 \quad (63)$$

As can be understood from Equation (63), in a planar array antenna including Ny number of linear array antennas, the signal amplitude vector becomes equal to Ny times than in the case of the liner array antennas, and the noise vector accompanying each configuration vector becomes $Ny^{0.5}$ as far as the effective value is concerned. Thus, in the planar array antenna, as compared to linear arrays, the power SN ratio is improved by Ny times.

Herein, corresponding to Equation (13-3) in the narrow beam forming calculating method in a linear array antenna, the incoming wave amplitude vector AGsn,mod θ on the θ plane can be detected from the linear equation attributed to the array output vector according to Equation (63). Moreover, in the frequency spectrum processing unit 8El, as a result of performing operations in the frequency space as illustrated in FIG. 8, it becomes possible to effectively enhance the SC ratio and the SN ratio.

Case of Formation of Quantized Narrow Beams on φ Axis

In this case, it is possible to directly implement the method of deriving the array output vector on the φ plane in the linear array antenna as given above in Equation (14-1) to Equation (18-3). Herein, the output vector to be used for narrow beam forming is given below in Equation (64). Moreover, JS0xφ and S0xφ are expressed below in Equations (65) and (66), respectively.

$$JSn0_{xy}\varphi = Ny * JS0_x\varphi + \sqrt{Ny} * Jn0 \quad (64)$$

$$JS0_x\varphi = AG_s\varphi * S0_x\varphi \quad (65)$$

$$S0_x\varphi(my, nx) = \exp\left[-j*2\pi*\left(\frac{Lsx}{\lambda}\right)*\sin(\theta_0)*\sin(\varphi_0)*\varphi_{my}*(nx-1)\right] \quad (66)$$

(my=1, 2, . . . , My; nx=1, 2, . . . , Nx)

In the narrow beam forming on the φ plane using the array output vector given in Equation (64), the incoming wave amplitude vector AGsn,mod φ can be detected as a result of implementing the method of narrow beam forming on the φ plane in the linear array antenna. Moreover, in the frequency spectrum processing unit 8Az, as a result of performing operations in the frequency space as illustrated in FIG. 8, it becomes possible to effectively enhance the SC ratio and the SN ratio.

Third Embodiment

Meanwhile, in the first embodiment, there are N number of the antenna elements as illustrated in FIG. 2, and the beamwidth $\theta_B$ of the transceiving beams on the elevation θ plane is divided into Mx number of divisions at the quantized unit angles. In contrast, in a third embodiment described below, a method is implemented in which, while maintaining the N number of the antenna elements, the beamwidth $\theta_B$ is divided into MMx=2*Mx number of divisions thereby doubling the angular resolution capability. The method according to the third embodiment can be implemented, for example, by making the virtual-array-induced quantized-multiple/narrow beam forming unit 6 of the radar system 100 according to the first embodiment to perform the operations explained below.

In the third embodiment, the fundamental reception matrix forms a rectangular matrix having the row vector number MMx=2*Mx (=2*N) and the column vector number=N, and is expressed as given below in Equation (67). Herein, Equation (68) to Equation (72) given below are established.

$$S0d = \begin{bmatrix} S0d_{11} S0d_{12} & \cdots & S0d_{1N} \\ S0d_{11} S0d_{12} & \cdots & S0d_{2N} \\ & \vdots & \\ S0d_{MMx,1} S0d_{MMx,2} & \cdots & S0d_{MMx,N} \end{bmatrix} \quad (67)$$

$$S0d(mx, nx) = \exp\left[j*2\pi*\left(\frac{Lsx}{\lambda}\right)*\cos(\varphi_0)*\cos(\theta_0)*\theta_{my}*(nx-1)\right] \quad (68)$$

$$\theta_{mx} = -0.5*\theta_B + (mx-0.5)*\Delta\theta \quad (69)$$

$$\Delta\theta = \theta_B / MMx, (MMx = 2*Mx = 2*N = NN) \quad (70)$$

$$mx = 1, 2, \ldots MMx \quad (71)$$

$$nx = 1, 2, \ldots N \quad (72)$$

Regarding the incoming waves having the signal incoming wave amplitude vector AGsd(1×2*Mx), the output vector received by a real array antenna having N number of the antenna elements is as given below in Equation (73). Herein, Jn0 represents the noise output vector of the length N and having the elements in the form of the gaussian noises that are independently generated in the reception systems of the N number of antenna elements.

$$JSn0d = AGsd * S0d + Jn0 \quad (73)$$

Subsequently, zero matrices of the size (2*Mx×N) are horizontally linked with the matrix S0d given in Equation (67), and a square matrix S00(2*Mx×2*N) is configured as given below in Equation (74).

$$S00 = [S0d \; zeros(2*Mx \times N)] \quad (74)$$

Accordingly, the real array output vector accompanying in the square matrix S00 is expressed using Equation (75) given below. Moreover, Jn00d is expressed using Equation (76). Meanwhile, Equation (75) corresponds to Equation (33).

$$JSn00d = AGsd * S00 + Jn00d \quad (75)$$

$$Jn00d = [Jn0 \; zeros(1 \times N)] \quad (76)$$

Since a noise output vector of a virtual array is generated that has the average power equivalent to the average power of the noise output vector Jn0 given in Equation (73), sample values Jn0B and Jn0C of a real array output noise vector are collected by actual measurement. Then, from the actual measurement data that is collected, a noise vector Jn0BC is configured in which the sample values Jn0B and Jn0C are connected as given in Equation (77) and which has the length of 2*N, and is set to have the same size as the signal incoming wave amplitude vector AGsd.

$$Jn0BC = [Jn0B \; Jn0C] \quad (77)$$

Moreover, using the noise vector Jn0BC given in Equation (77), a virtual noise incoming-wave amplitude vector is set as given below in Equation (78).

$$AGnd = \frac{Jn0BC}{\sqrt{2*(2*Mx)}} \quad (78)$$

On the right-hand side of Equation (78), (2*Mx=MMx) under the square root corresponds to the vector length of AGnd and the value "2" multiplied thereto represents a correction coefficient for ensuring that the average power of the noise output vector (AGnd*S00) of the virtual array becomes equivalent to the average power of the original real array output noise vector. As a result, as the output vector attributed to the virtual array, Equations (79-1) and (79-2) are obtained that are configured with JSn00d attributed to the output vector of the real array antenna and the noise output amplitude vector (AGnd*S00) attributed to the virtual noise incoming wave.

$$JSn00v = JSn00d + AGnd*S00 \quad (79\text{-}1)$$
$$= AGsd*S00 + [Jn0d\ zeros(1 \times N)] + AGnd*S00 \quad (79\text{-}2)$$

Subsequently, with respect to the output vector Jsn00v obtained from the actual measurement values mentioned above, Equation (80-1) to Equation (80-3) having the actual measurement values are implemented.

$$JSn00u = JSn00v - [Jn0A\ zeros(1 \times N)] \quad (80\text{-}1)$$
$$= AGsd*S00 + AGnd*S00 + \quad (80\text{-}2)$$
$$[(Jn0d - Jn0A)zeros(1 \times N)]$$
$$= AGsnd*S00 + [(JSn0d - JSn0A)zeros(1 \times N)] \quad (80\text{-}3)$$

The actual measurement values JSn0d and JSn0A of the real array output vectors having the same signal incoming waves are obtained, and then relation of Equations (81) and (82) given below are used to obtain Equation (80-3).

$$JSn0d = AGsd*S00 + [Jn0d\ zeros(1 \times N)] \quad (81)$$
$$JSn0A = AGsd*S00 + [Jn0A\ zeros(1 \times N)] \quad (82)$$

From both sides of Equation (80-3) given above, if [(JSn0d-JSn0A) zeros(1×N)] is subtracted, then the virtual array output vector JSn00w related to the matrix S00 is obtained using Equations (83-1) and (83-2) given below. Herein, AGsnd is equal to AGsd+AGnd.

$$JSn00w = JSn00u - (JSn0d - JSn0A) \quad (83\text{-}1)$$
$$= AGsnd*S00 \quad (83\text{-}2)$$

The matrix S00 given above in Equation (83-2) is a singular matrix including the reception matrix S0d, which includes N number of antenna elements, and zero matrices. Hence, approximate transformation is performed to desired matrix S01 having the same size as the size in the case of receiving with 2*N number of antenna elements, and a singular linear equation is derived below. Meanwhile, the desired matrix S01 is set using Equations (84) to (87) given below.

$$S01 = \begin{bmatrix} S0d_{11} S0d_{12} & \dots & S0d_{1,2N} \\ S0d_{21} S0d_{22} & \dots & S0d_{2,2N} \\ & \vdots & \\ S01_{MMx,1} S01_{MMx,2} & \dots & S01_{MMx,2N} \end{bmatrix} \quad (84)$$

$$S01(mx, nx) = \exp\left[j*2\pi*\left(\frac{Lsx}{\lambda}\right)*\cos(\varphi_0)*\cos(\theta_0)*\theta_{mx}*(nx-1)\right] \quad (85)$$

$$mx = 1, 2, \dots MMx(=2*N) \quad (86)$$
$$nx = 1, 2, \dots NN(=2*N) \quad (87)$$

In the reception matrix S01(MMx×2*N) given in Equation (84), the left half represents S0d according to Equation (67) and the right half is equivalent to the case of increasing the number of columns of S0d from N+1 to 2N; and the phases of the row vectors are linearly continuous. Subsequently, the calculation is performed in such a way that the approximate value corresponding to the desired matrix S01 is derived according to the method explained below.

Calculation of Primary Approximate Value

Fundamental Equation (3): $S00*Wx1=S01$ (88)

In Fundamental Equation (3) given above in Equation (88), a primary approximate transformation matrix Wx1 is set using Equation (89) given below. As a result of using the primary approximate transformation matrix Wx1 in Equation (88), a primary approximate value S01x1 corresponding to the desired matrix S01 and an error matrix dS01x1 corresponding to the desired matrix S01 are obtained as given below in Equations (90) and (91), respectively.

$$Wx1 = pinv(S00)*S01 \quad (89)$$
$$S01x1 = S00*Wx1 \quad (90)$$
$$dS01x1 = S01 - S01x1 \quad (91)$$

Calculation of Secondary Approximate Value

Fundamental Equation (4): $S00*Wx2=dS01x1$ (92)

In Fundamental Equation (4) given above in Equation (92), a secondary approximate transformation matrix Wx2 is set using Equation (93) given below. As a result of using the secondary approximate transformation matrix Wx2 in Equation (92), a secondary approximate value dS01x2 corresponding to the desired matrix dS01x1 is obtained as given below in Equation (94).

$$Wx2 = pinv(S00)*dS0x1 \quad (93)$$
$$dS01x2 = S00*Wx2 \quad (94)$$

Synthesizing Operation

Subsequently, Equation (90) of the primary approximation and Equation (94) of the secondary approximation are added and an integrated approximate matrix S01x corresponding to the desired matrix S01 is obtained as given in Equations (95-1) and (95-2).

$$S01x = S01x1 + dS01x2 \quad (95\text{-}1)$$
$$= S00(Wx1 + Wx2) \quad (95\text{-}2)$$

Using the obtained approximate matrix S01x, when the output vector JSn00w of the virtual array as given in Equation (83-2) is transformed as given below in Equations (96-1) to (96-2), a singular linear equation is obtained that is to be used in obtaining the incoming wave amplitude vector AGsnd.

$$JSn00x = JSn00w * (Wx1 + Wx2) \quad (96\text{-}1)$$
$$= AGsnd * S01x \quad (96\text{-}2)$$

In the virtual-array-induced quantized-multiple/narrow beam forming unit 6, as a result of deriving a non-singular linear equation according to the method explained with reference to Equation (40) to Equation (48) given earlier, it becomes possible to obtain the incoming wave amplitude vector AGsnd,mod in the case when the inside of the beam is finely divided into 2*Mx divisions (quantized unit angle=0.5*Δθ) that are double the divisions according to the first embodiment.

Example of Calculation Result

Figure 11A:
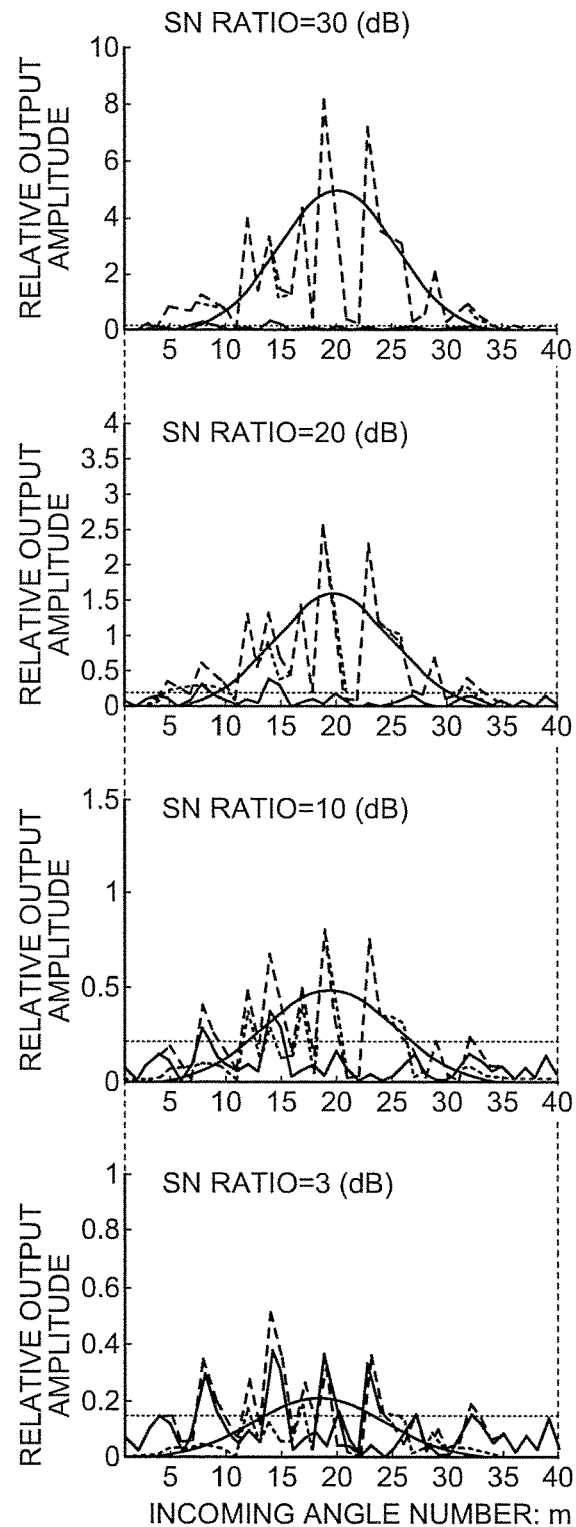
FIG. 11A is a diagram illustrating a result of the same type as FIG. 5B with respect to the reception incoming waves of the same type as illustrated in FIG. 5B, when quantized narrow beams are formed according to the method implemented in the first embodiment.
Figure 11B:
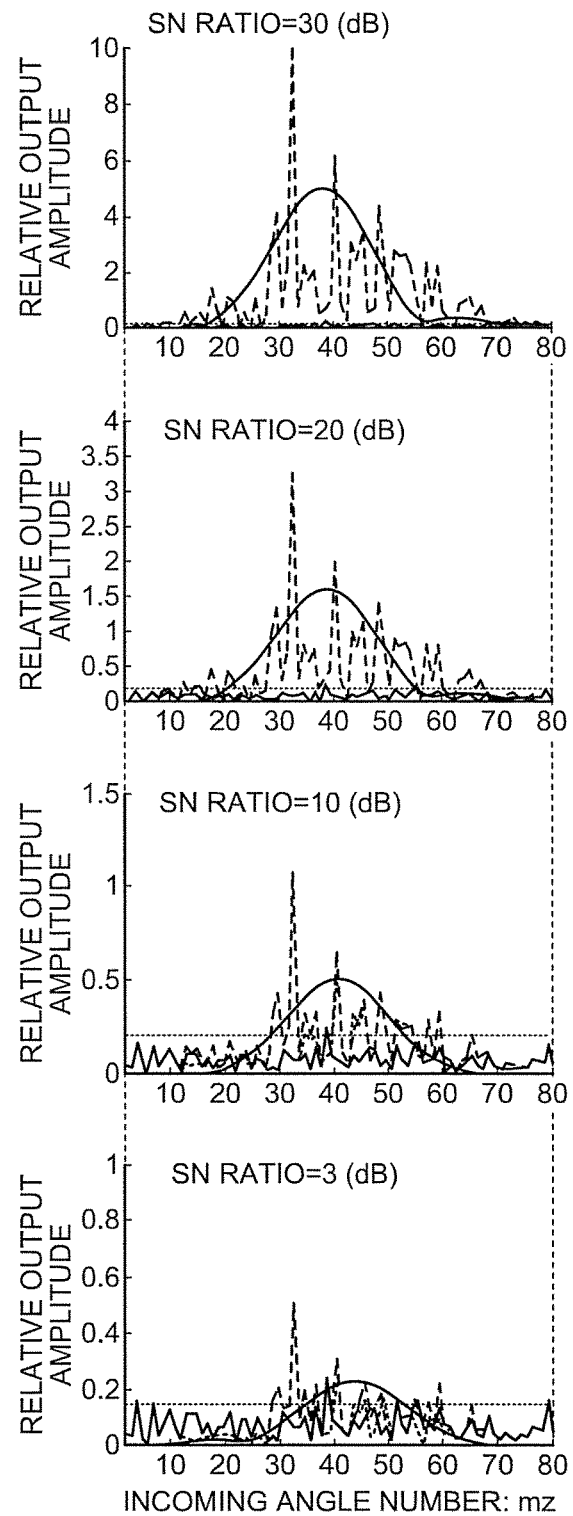
FIG. 11B is a diagram that contrasts FIG. 11A and that illustrates the relationship between the detected amplitude and the incoming angle in a corresponding manner to the changes in the SN ratio in the case in which quantized narrow beams are formed according to the method implemented in the third embodiment for reduction of quantized unit angle width under the same number of array elements.

Explained below is an exemplary calculation result of the sequence of data processing described earlier. FIGS. 11A and 11B are diagrams illustrating the relationship between the detected amplitudes and the incoming angles in tune with the changes in the SN ratio in the case in which quantized narrow beams are formed by implementing the method according to the third embodiment with respect to the reception incoming wave illustrated in FIG. 4B. More particularly, FIG. 11A like as FIG. 5B, represents a detection result of a random amplitude wave at the angular resolution capability of (beamwidth $\theta_B$/Mx=$\theta_B$/40) in the case in which, at the transmission antenna gain maximum point (beam center), the incoming wave amplitude vector AGsn is set according to the SN ratio defined regarding the reference wave of effective amplitude 1. FIG. 11B represents the detection result AGsnd,mod of the random amplitude wave in the case in which the angular resolution capability in FIG. 11A is increased to (beamwidth $\theta_B$/MMx=$\theta_B$/80). Meanwhile, with the aim of having clarity, the incoming wave number is referred to as mz.

In FIG. 11B, under the noise output level of the virtual array antenna having a certain effective amplitude illustrated by the dotted line, the initial setting value AGsnd of the amplitude vector of (the signal wave+the virtual noise wave) closely matches with the calculated detection vector AGsnd, mod, the dashed line is illustrated in an overlapping manner at a number of places. Moreover, in FIG. 11B, as compared to the detection result illustrated in FIG. 11A, the angular resolution capability is doubled indicating that the angular distribution of the reflection strength of the target object can be more accurately observed. Meanwhile, regarding the signal wave amplitude included in the calculated detection vector AGsn,mod, the estimate accuracy is equivalent to that in the case illustrated in FIG. 5. Moreover, by implementing the method according to the third embodiment, the number of row vectors of the matrix S0d given in Equation (67) can be further increased by a multiple of two and the angular resolution capability can be enhanced.

Moreover, in the third embodiment, if a combination with the DFT filter according to the second embodiment is used, it is effective in further performing accurate radar observation after the SN ratio has been improved.

Meanwhile, although the embodiments described above are related to a radar system in which radio waves are used, the present invention can also be applied to the test measurement equipment of the reflected wave reduction technology (the stealth technology) for a radar reflecting object, identification of true target or false target in multipass environment, and to the measurement of the incoming angle/signal strength of the received radio waves (the radio wave direction finder). Moreover, the present invention is not limited to the case of using radio waves, and can be applied in a sonar that detects and measures underwater objects using sound waves and a radio wave/sound wave detector for ground-burial objects. Besides, the present invention can be expected to be applied in ultrasound medical diagnosis equipment.

According to the present invention, a plurality of reflected incoming waves in a transceiving beam can be separated and detected according to angles, and target information can be obtained in an accurate and steady manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for quantized-multiple/narrow beam forming within a transceiving beamwidth, comprising:

forming, by a real-array-antenna output vector data forming unit, as a real array antenna output vector, an output amplitude vector of an array antenna that is made of addition values of a signal incoming wave reception output which are received and a reception system noise output, in an array antenna in which at least a single linear array antenna having a plurality of antenna elements arranged therein is placed;

generating, by a virtual-array-antenna-output amplitude vector generating unit, using the real array antenna output vector, a virtual array antenna output amplitude vector that is made of addition values of a signal incoming wave reception output amplitude and a virtual noise wave reception output amplitude vector which is set in such a way that array output average power of the virtual noise wave is equivalent to average power of the reception system noise output, and deriving a singular linear equation indicating cause-effect relationship of concerned generation;

deriving, by a synthesizing unit, a non-singular linear equation from the singular linear equation by approximation; and obtaining, by a calculation detecting unit, a signal incoming wave amplitude vector and a virtual noise wave amplitude vector via the non-singular linear equation, wherein in the deriving the singular linear equation, the virtual-array-antenna-output amplitude vector generating unit generates a virtual array antenna output amplitude vector such that the virtual array antenna output amplitude vector includes amplitudes in quantized-unit-angle narrow beams incoming waves obtained by dividing the transceiving beamwidth of the incoming wave into quantized unit angles.

2. The method for quantized-multiple/narrow beam forming within a transceiving beamwidth according to claim 1, wherein time-series data of the obtained signal incoming wave amplitude vector is passed through an MTI filter and clutter is suppressed, frequency spectrum components of residual clutter and noise in the time-series data, in which the clutter has been suppressed, is divided/separated into narrowband filters constituting a DFT filter, and information such as incoming angle, strength, and Doppler frequency of detected signals within the transceiving beamwidth is extracted using output data from the narrowband filters.

3. A device for quantized-multiple/narrow beam forming within a transceiving beamwidth, comprising:
   an array antenna in which at least a linear array antenna, which has a plurality of antenna elements arranged therein, is placed;
   a real-array-antenna output vector data forming unit that forms, as a real array antenna output vector, an output amplitude vector of an array antenna that is made of addition values of a signal incoming wave reception output which are received and a reception system noise output, in the array antenna;
   a virtual-array-antenna-output amplitude vector generating unit that generates, using the real array antenna output vector, a virtual array antenna output amplitude vector that is made of addition values of a signal incoming wave reception output amplitude vector and a virtual noise wave reception output amplitude vector which is set in such a way that array output average power of the virtual noise wave is equivalent to average power of the reception system noise output, and derives a singular linear equation indicating cause-effect relationship of concerned generation;
   a synthesizing unit that derives a non-singular linear equation from the singular linear equation by approximation; and
   a calculation detecting unit that obtains a signal incoming wave amplitude vector and a virtual noise wave amplitude vector via the non-singular linear equation, wherein
   during derivation of the singular linear equation, the virtual-array-antenna-output amplitude vector generating unit generates a virtual array antenna output amplitude vector such that the virtual array antenna output amplitude vector includes amplitudes in quantized-unit-angle narrow beams obtained by dividing the transceiving beamwidth of the incoming wave into quantized unit angles.

4. A radar system comprising the device for quantized-multiple/narrow beam forming within a transceiving beamwidth according to claim 3.

5. A method for quantized-multiple/narrow beam forming within a transceiving beamwidth executed by a processor, comprising:
   forming, as a real array antenna output vector, an output amplitude vector of an array antenna that is made of addition values of a signal incoming wave reception output which are received and a reception system noise output, in an array antenna in which at least a single linear array antenna having a plurality of antenna elements arranged therein is placed;
   generating, using the real array antenna output vector, a virtual array antenna output amplitude vector that is made of addition values of a signal incoming wave reception output amplitude vector and a virtual noise wave reception output amplitude vector which is set in such a way that array output average power of the virtual noise wave is equivalent to average power of the reception system noise output, and deriving a singular linear equation indicating cause- effect relationship of concerned generation;
   deriving, a non-singular linear equation from the singular linear equation by approximation; and
   obtaining, a signal incoming wave amplitude vector and a virtual noise wave amplitude vector via the non-singular linear equation, wherein
   in the deriving the singular linear equation, a virtual array antenna output amplitude vector is generated such that the virtual array antenna output amplitude vector includes amplitudes in quantized-unit-angle narrow beams incoming waves obtained by dividing the transceiving beamwidth of the incoming wave into quantized unit angles.

6. The method for quantized-multiple/narrow beam forming within a transceiving beamwidth according to claim 5, wherein
   time-series data of the obtained signal incoming wave amplitude vector is passed through an MTI filter and clutter is suppressed,
   frequency spectrum components of residual clutter and noise in the time-series data, in which the clutter has been suppressed, is divided/separated into narrowband filters constituting a DFT filter, and
   information such as incoming angle, strength, and Doppler frequency of detected signals within the transceiving beamwidth is extracted using output data from the narrowband filters.

7. A device for quantized-multiple/narrow beam forming within a transceiving beamwidth, comprising:
   an array antenna in which at least a linear array antenna, which has a plurality of antenna elements arranged therein, is placed; and
   a processor that;
      forms, as a real array antenna output vector, an output amplitude vector of an array antenna that is made of addition values of a signal incoming wave reception output which are received and a reception system noise output, in the array antenna;
      generates, using the real array antenna output vector, a virtual array antenna output amplitude vector that is made of addition values of a signal incoming wave reception output amplitude vector and a virtual noise wave reception output amplitude vector which is set in such a way that array output average power of the virtual noise wave is equivalent to average power of the reception system noise output, and derives a singular linear equation indicating cause-effect relationship of concerned generation;
      derives a non-singular linear equation from the singular linear equation by approximation; and
      obtains a signal incoming wave amplitude vector and a virtual noise wave amplitude vector via the non-singular linear equation, wherein
   during derivation of the singular linear equation a virtual array antenna output amplitude vector is generated such that the virtual array antenna output amplitude vector includes amplitudes in quantized-unit-angle narrow beams obtained by dividing the transceiving beamwidth of the incoming wave into quantized unit angles.

8. A radar system comprising the device for quantized-multiple/narrow beam forming within a transceiving beamwidth according to claim 7.

* * * * *